United States Patent
Shukla et al.

(10) Patent No.: US 10,924,343 B1
(45) Date of Patent: Feb. 16, 2021

(54) EVENT PROPAGATION AND ACTION COORDINATION IN A MESH NETWORK

(71) Applicant: Amazon Technologies, Inc., Seattle, WA (US)

(72) Inventors: Ashish Kumar Shukla, Milpitas, CA (US); Kiran Kumar Edara, Cupertino, CA (US); Kun Ting Tsai, Fremont, CA (US); Sarang Wagholikar, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 16/254,355

(22) Filed: Jan. 22, 2019

(51) Int. Cl.
  *H04L 12/24* (2006.01)
  *H04L 29/08* (2006.01)
  *H04W 84/18* (2009.01)

(52) U.S. Cl.
  CPC ........ *H04L 41/0816* (2013.01); *H04L 67/104* (2013.01); *H04W 84/18* (2013.01)

(58) Field of Classification Search
  CPC .................................................. H04L 41/0816
  See application file for complete search history.

(56) References Cited

U.S. PATENT DOCUMENTS

| | | | | |
|---|---|---|---|---|
| 9,086,509 B2* | 7/2015 | Knutson | | G03F 7/70225 |
| 10,111,099 B2* | 10/2018 | Hunt | | H04L 67/104 |
| 10,595,185 B1* | 3/2020 | Chen | | H04W 72/12 |
| 2016/0267637 A1* | 9/2016 | Hsiao | | G06F 16/5854 |
| 2017/0366956 A1* | 12/2017 | Yoshida | | H04W 72/005 |
| 2019/0158975 A1* | 5/2019 | Petersen | | H04W 4/70 |
| 2019/0268633 A1* | 8/2019 | Jayawardene | | H04N 21/8456 |

* cited by examiner

*Primary Examiner* — Andrew Lai
*Assistant Examiner* — Andrew C Lee
(74) *Attorney, Agent, or Firm* — Lowenstein Sandler LLP

(57) ABSTRACT

Technology for event propagation and action coordination in a mesh network is described. In one embodiment, a master mesh node for a first communication channel in a mesh network receives a first event notification message from a first dependent mesh node associated with the master mesh node. The first event notification message pertains to a first event detected by the first dependent mesh node. In response, the master mesh node generates a first action message specifying a first action associated with the first event and sends the first action message to the first dependent mesh node and to a second dependent mesh node associated with the master mesh node. The master mesh node, the first dependent mesh node, and the second dependent mesh node all exchange communications with each other using the first communication channel in the mesh network.

20 Claims, 13 Drawing Sheets

EVENT PROPAGATION AND ACTION COORDINATION IN A MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
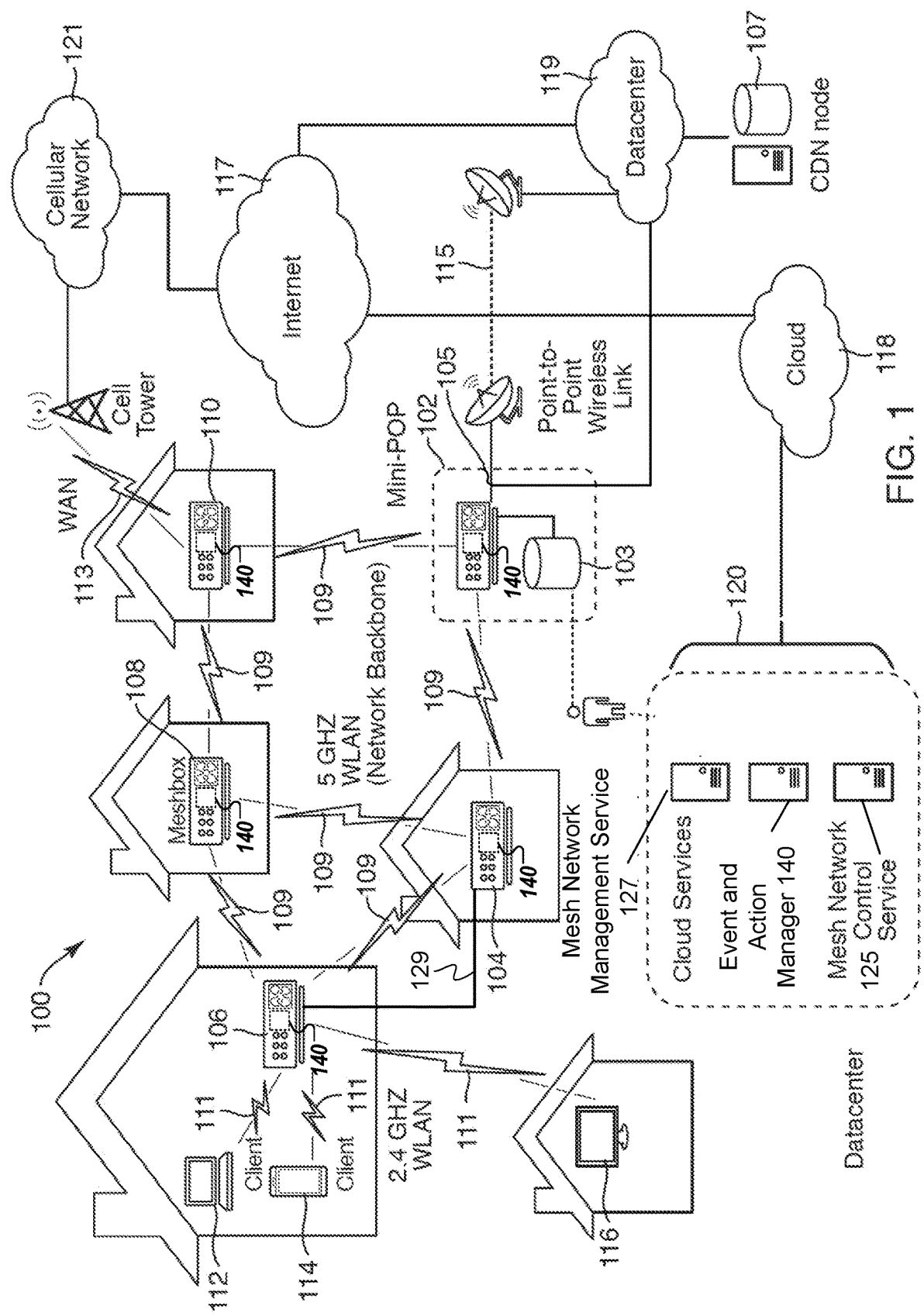
FIG. 1 is a network diagram of network hardware devices organized in a mesh network for content distribution to client devices in an environment of limited connectivity to broadband Internet infrastructure, according to an embodiment.

Technology for event propagation and action coordination in a mesh network is described herein. Mesh nodes of a mesh network may establish peer-to-peer wireless links for sharing data using communication channels defined by certain frequency bandwidths. The wireless link may be for example, an Institute of Electrical and Electronics Engineers (IEEE) 802.11 wireless communication link (e.g., Wi-Fi) having one or more communication channels each occupying certain frequencies. In an illustrative example, a mesh network may be employed for digital content distribution to client consumption devices in an environment of limited connectivity to broadband Internet infrastructure (e.g., for the delivery of media content to homes in dense urban areas). In one embodiment, the mesh network uses 802.11s based Wi-Fi mesh networking to provide connectivity for the distribution of content. The mesh nodes of the mesh network may form a content distribution network (CDN) and client consumption devices connected to these mesh nodes can receive content from the CDN.

Current regulatory requirements require wireless devices to avoid interfering with radar systems operating in the same frequency bandwidths. The mesh nodes of a multi-radio mesh network may utilize a dynamic frequency selection (DFS) protocol. The DFS protocol is defined in the IEEE 802.11 standard and allows access points (APs) and stations (STAs) in an independent basic service set (IBSS) network to comply with these regulations. Currently, the IEEE 802.11 standard defines protocols for the AP-STA BSS network, IBSS and tunneled direct link setup (TDLS) links. The standard, however, does not define a DFS protocol for IEEE 802.11s based mesh basic service set (MBSS) networks. Accordingly, there is presently no efficient way for mesh nodes in a mesh network to change communication channels when radar is detected in order to comply with the regulatory requirements. Furthermore, propagating event messages and coordinating actions among the mesh nodes of the mesh network is inefficient at best and often unfeasible.

Aspects of the present disclosure address the above and other considerations by defining a protocol is for electing one or more master mesh nodes in a mesh network, where each master mesh node listens to a specific set of events, originated from other mesh nodes (i.e., dependent mesh nodes) in the network. Upon receiving intended events, the master mesh node(s) can schedule coordinated and pre-defined actions on the other mesh nodes that are following the same master. This idea can be used to comply with the radar avoidance regulations described above, as well as to other classes of use-cases. For example, instead of indicating the detection of radar signals, the event may include the detection of other interference on the current communication channel, the indication that a certain media content item is available for distribution, a discrete user trigger, or any other possible event.

The multi-radio mesh DFS protocol described herein covers the signaling scheme in terms of radar detection, event propagation, channel change coordination, error recovery, etc. The actual radar detection is provided by the Wi-Fi firmware, driver module or by a separate radio performing continuous radar detection in each mesh node, and is not described in detail so as not to obscure the details of the present disclosure. It can be understood, however, that each mesh node may include multiple radios, and that each of these radios can potentially detect radar signals. The multiple radios may each implement logic to avoid false radar detections that may be attributable to channel noise and/or other interference.

In one implementation, the current communication channel used by a radio is determined by a channel management controller, which runs a distributed algorithm locally on the mesh node, in cloud based server, or in a combination of both, based on the periodic channel metrics collected from the devices. In general, channel assignment is performed by the channel management controller, except when radar signals are detected. When radar signals are detected, the protocol described herein may override current channel assignments for the DFS channels in order to ensure compliance with the applicable regulatory requirements.

In one embodiment, when a mesh network is first initiated (e.g., launched, started-up, etc.) one mesh node may be designated as a master mesh node for a given communication channel by default (e.g., the first mesh node that boots up). As other mesh nodes are added to the network, those mesh nodes may receive beacons broadcast periodically by the current master mesh node for the shared communication channel. The beacons may include a master mesh node sub-element having data representing an identifier of the current master mesh node and information about a number of peer mesh nodes associated with the current master mesh node. Peer mesh nodes in the mesh network are direct neighboring mesh nodes that have no intervening mesh nodes between them and, thus, are only one hop away from each other. The peer mesh nodes can be either the master mesh node or one of the dependent mesh nodes. In one embodiment, each mesh node in the mesh network, whether the master mesh node or a dependent mesh node, maintains a count of the number of peer mesh nodes associated therewith for use in electing a master mesh node for the current communication channel. A dependent mesh node that receives the master mesh node sub-element may determine whether it is a better candidate to be the master mesh node for the shared communication channel by comparing a number of peer mesh nodes that it has to the number of peer mesh nodes associated with the current master mesh node. If the dependent mesh node has a higher number of peer mesh nodes than the current master, or if the number of peer mesh nodes is the same but some other criterion is satisfied (e.g., a media access control (MAC) address of the dependent mesh node is lower than a MAC address of the current master mesh node), the dependent mesh node may elect itself as the new master mesh node for the shared communication channel. Accordingly, the dependent mesh node (now the new master mesh node) may assume responsibility for coordinating actions among a set of dependent mesh nodes that share the same communication channel in the mesh network. In one embodiment, each of the dependent mesh nodes in the mesh network performs a similar evaluation to determine whether they would be a better candidate for master mesh node each time a beacon with a master mesh node sub-element is received.

Upon receiving an event notification message from one of the dependent mesh nodes indicating the occurrence of an event (e.g., detection of radar signals or other interference on the shared communication signal, the availability of a media content item for distribution, etc.), the new master mesh node may send an action message to the dependent mesh nodes. The action message may include instructions to cause the dependent mesh nodes to take some action, such as to switch to a different communication channel. Accordingly, event propagation and action coordination is streamlined in the mesh network by virtue of the master mesh node/dependent mesh node hierarchy. The election of a master mesh node ensures that the mesh network bandwidth is used most efficiently and the sending of event notification and action messages to and from the master mesh node allows for efficient coordination among the nodes of the mesh network to address any issues that may arise.

FIG. 1 is a network diagram of network hardware devices 102, 104, 106, 108, and 110 (also referred to herein as mesh nodes), organized in mesh network 100, for content distribution to client consumption devices in an environment of limited connectivity to broadband Internet infrastructure, according to one embodiment. The mesh network 100 includes multiple network hardware devices 102, 104, 106, 108, and 110 that connect together to transfer digital content through the mesh network 100 to be delivered to one or more client consumption devices connected to the mesh network 100. In the depicted embodiment, the mesh network 100 includes a miniature point-of-presence (mini-POP) device 102 (also referred to as a mini-POP device), having a first wired connection to an attached storage device 103 and potentially at least one of a wired connection 105 or point-to-point wireless connection 115 to a content delivery network (CDN) device 107 (server of a CDN or a CDN node) of an Internet Service Provider (ISP), or both. The CDN device 107 may be a POP device, an edge server, a content server device, or another device of the CDN. The mini-POP device 102 may be similar to POP devices of a CDN in operation. However, the mini-POP device 102 is called "miniature" to differentiate it from a POP device of a CDN given the nature of the mini-POP device 102 being a single ingress point to the mesh network 100; whereas, the POP device of a CDN may be one of many in the CDN.

The point-to-point wireless connection 115 may be established over a point-to-point wireless link 115 between the mini-POP device 102 and the CDN device 107. Alternatively, the point-to-point wireless connection 115 may be established over a directional microwave link between the mini-POP device 102 and the CDN device 107. In other embodiments, the mini-POP device 102 is a single ingress node of the mesh network 100 for the content files stored in the mesh network 100. Thus, the mini-POP 102 may be the only node in the mesh network 100 having access to the attached storage and/or a communication channel to retrieve content files stored outside of the mesh network 100. In other embodiments, multiple mini-POP devices may be deployed in the mesh network 100, but the number of mini-POP devices may be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. All of the network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless connection 115. The point-to-point wireless connection 115 can be considered a broadband connection for the mesh network 100. In some cases, the mini-POP device 102 does not have an Internet connection via the point-to-point wireless connection 115 and the content is stored only in the attached storage device 103 for a self-contained mesh network 100. In such cases, the content in the attached storage can be manually refreshed from time to time.

The mesh network 100 also includes multiple mesh nodes 104, 106, 108, and 110 (also referred to herein as meshbox nodes and network hardware devices). The mesh nodes 104, 106, 108, and 110 may establish multiple P2P wireless connections 109 between mesh nodes 104, 106, 108, and 110 to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection 109. In addition, one or more of the mesh nodes 104, 106, 108, and 110 may be connected via a wired communication link. In particular, the first mesh node 104 is coupled to the second mesh node 106 via a wired communication link 129. In embodiments, where mesh network 100 includes both wireless communication links 109 and at least one wired communication link 129, the mesh network 100 may be referred to herein as a "hybrid" mesh network. The mesh nodes 104, 106, 108, and 110 (and the mini-POP device 102) may be multi-radio multi-channel (MRMC) mesh network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 102, 104, 106, 108, and 110 communicate data with one another via the first set of WLAN channels at a first frequency of approximately 5 GHz (e.g., 5 GHz band of the Wi-Fi® network technologies).

Each of the mesh nodes 104, 106, 108, and 110 (and the mini-POP device 102) also includes multiple node-to-client consumption devices (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 via a first N2C wireless connection 111, a second client consumption device 114 via a second N2C wireless connection 111, and a third client consumption device 116 via a third N2C wireless connection 111. Client consumption devices can include TVs, mobile phones, streaming media players, PCs, Tablets, game consoles, and the like. The second node 106 wirelessly communicates with the client consumption devices via the second set of WLAN channels at a second frequency of approximately 2.4 GHz (e.g., 2.4 GHz band of the Wi-Fi® network technologies).

One or more of the mesh nodes 104, 106, 108, and 110 (and the mini-POP device 102) also includes a cellular connection 113 to wirelessly communicate control data between the respective node and a cloud device 118 hosting a mesh network control service 125 described below. The cellular connection 113 may be a low bandwidth, high availability connection to the Internet 117 provided by a cellular network 121. The cellular connection 113 may have a lower bandwidth than the point-to-point wireless connection 115. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The cloud device 118 may be one of a collection of devices organized as a cloud computing system that that hosts one or more services 120. Although cellular connection 113 may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like). As a result of cellular connection 113, or other external connection (e.g., Ethernet, Fiber, etc.), mesh node 110 and mini-POP device 102 can be considered gateway computing devices and/or root nodes. Other mesh nodes 104, 106, and 108 can communicate with the root nodes to access network resources external to the mesh network 100, such as CDN device 107, Internet 117, cloud device 118, datacenter 119, cellular network 121, or other external resources.

Figure 7A:
FIG. 7A is a block diagram illustrating a radar report sub-element, according to an embodiment.
Figure 7B:
FIG. 7B is a block diagram illustrating a master mesh node sub-element, according to an embodiment.

In one embodiment, each of nodes 102, 104, 106, 108, and 110 may include an instance of event and action manager 140. Event and action manager 140 can determine a corresponding status (i.e., master or dependent) of the node on which it runs and perform event propagation and/or action coordination operations as appropriate for the status. For example, in one embodiment where mesh node 104 is a dependent node, the event and action manager 140 running thereon may receive beacons broadcast periodically by the current master node (e.g., node 102) for a communication channel shared by nodes 102 and 104 (and potentially other nodes in the mesh network 100. The beacons may be sent by the instance of event and action manager 140 running on the master node and may include a master node sub-element, as illustrated in FIG. 7B and described in more detail below, having data representing an identifier of the current master node (e.g., a MAC address of node 102) and information about a number of peer nodes associated with the current master node. Upon receiving the master node sub-element, the instance of event and action manager 140 running on mesh node 104 may determine whether mesh node 104 is a better candidate to be the master node for the shared communication channel by comparing a number of peer nodes that mesh node 104 has to the number of peer nodes associated with the current master node 102. If the dependent node 104 has a higher number of peer nodes than the current master node 102, or if the number of peer nodes is the same but some other criterion is satisfied (e.g., a MAC address of the dependent node 104 is lower than a MAC address of the current master node 102), event and action manager 104 may elect dependent node 104 as the new master node for the shared communication channel. As a result, the new master node 104 may assume responsibility for coordinating actions among a set of dependent nodes that share the same communication channel in the mesh network 100, and node 102 may switch its status to be a dependent node going forward. Upon receiving an event notification message from one of the dependent nodes indicating the occurrence of an event (e.g., detection of radar signals or other interference on the shared communication signal, the availability of a media content item for distribution, etc.), event and action manager 140 on new master node 104 may send an action message to the dependent nodes. The action message may include instructions to cause the dependent nodes to take some action, such as to switch to a different communication channel, or some other action. Additional details of event and action manager 140 are provided below.

As described above, the mesh network 100 may include one or more cloud services 120. The cloud services 120 may include a mesh network control service 125 and a mesh network management service (or system) 127. The services 120 may also include cloud services to control setup of and manage the mesh nodes, an instance of event and action manager 140, as well as other cloud services. In one embodiment, event and action manager 140 is a subcomponent of the larger mesh network management service 127 which provides other functionality in addition to event propagation and action coordination. The mesh network control service 125 can be one or more cloud services. These cloud services can include a metric collector service, a health and status service, a link selection service, a channel selection service, a content request aggregation service, or the like. There may be APIs for each of these services. Thus, in one embodiment, event and action manager 140 can be deployed in a centralized configuration in which the event and action manager 140 is deployed as a centralized controller, such as part of mesh network management service 127 or one of other services 120. Alternatively, in other embodiments, event and action manager 140 can run directly on any or each of nodes 102, 104, 106, 108, and 110 in mesh network 100. Additional details regarding the operations of event and action manager 140 are provided below with respect to FIGS. 3-7.

Although only four mesh nodes 104, 106, 108, and 110 are illustrated in FIG. 1, the mesh network 100 can use many mesh nodes, wirelessly connected together in a mesh network, to move content through the mesh network 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running client software (i.e., a media client). In one embodiment, the client software may be an application or other program designed to enable access to the CDN catalog and provide for playback video titles or other media items selected therefrom, in response to a request from a user. The 2.4 GHz WLAN channels are reserved for serving client consumption devices. The 2.4 GHz band may be chosen for serving media clients because there is a wider device adoption and support for this band. Additionally, the bandwidth requirements for serving client consumption devices will be lower than that of the network backbone. The number of media clients that each Meshbox node can support depends on a number of factors including memory, bandwidth requirements of the media client, incoming bandwidth that the Meshbox node can support, and the like. For example, the Meshbox nodes provide coverage to users who subscribe to the content delivery service and consume that service through the client consumption devices (e.g., a mobile phone, a set top box, a tablet, or the like). It should be noted that there is a 1-to-many relationship between Meshbox nodes and households (not just between nodes and media clients). This means the service can be provided without necessarily requiring a user to have a Meshbox node located in their house, as illustrated in FIG. 1. As illustrated, the second mesh node 106 services two client consumption devices 112, 114 located in a first house, as well as a third client consumption device 116 (e.g., a TV client) located in a second house. The Meshbox nodes can be located in various structures, and there can be multiple Meshbox nodes in a single structure.

The mesh network 100 may be used to address two main challenges: moving high bandwidth content to users and storing that content in the limited available storage of the mesh network itself. The first challenge may be addressed in hardware through the radio links between mesh nodes and the radio links between mesh nodes and client consumption devices, and in software by the routing protocols used to decide where to push traffic and link and channel management used to configure the mesh network 100. The second challenge may be addressed by borrowing from the existing content distribution strategy employed by the content delivery services using caches of content close to the user. The architecture to support content caching is known as a CDN. An example CDN implementation is the AWS CloudFront service. The AWS CloudFront service may include several point-of-presence (POP) racks that are co-located in datacenters that see a lot of user traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 may not have a wired or wireless network connection to the next level of cache (i.e., in CDN node 107). In another embodiment, the mini-POP device 102 may have a network connection (e.g., via the Internet) to the next level of cache, but this connection may not be a high-speed backhaul such as that used in a traditional data center. The following describes two different solutions for providing access to the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The mesh network 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 115 or the HITL process at the mini-POP device 102. Availability and impact on cost in terms of storage may be relevant factors in determining which content is to be injected into the mesh network 100 and which content is to remain in the mesh network 100. A challenge for traditional mesh network architectures is that this content is high bandwidth (in the case of video) and so the gateway nodes (e.g., mesh node 110 and mini-POP device 102) that connect the mesh to the larger Internet 117 must be also be high bandwidth. However, taking a closer look at the use case reveals that this content, although high bandwidth, does not need to be low latency. The embodiments of the mesh network 100 described herein can provide distribution of content that is high bandwidth, but in a manner that does not need low latency. Thus, popular content can reside closer to the client consumption devices of the mesh network 100 and reduce the latency normally associated with retrieving that content from the CDN.

In some embodiments, prior to consumption by a node having a media client itself or being wirelessly connected to a media client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the mesh network 100. The mesh network 100 can provide some fault tolerance so that a single mesh node becoming unavailable for failure or reboot has minimal impact on availability of content to other users. This means that a single mesh node is not the sole provider of a piece of content. The mesh network 100 can use reliability and availability mechanisms and techniques to determine where and how to store content in the mesh network 100.

The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified. Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, DRM, and node authentication.

Figure 2:
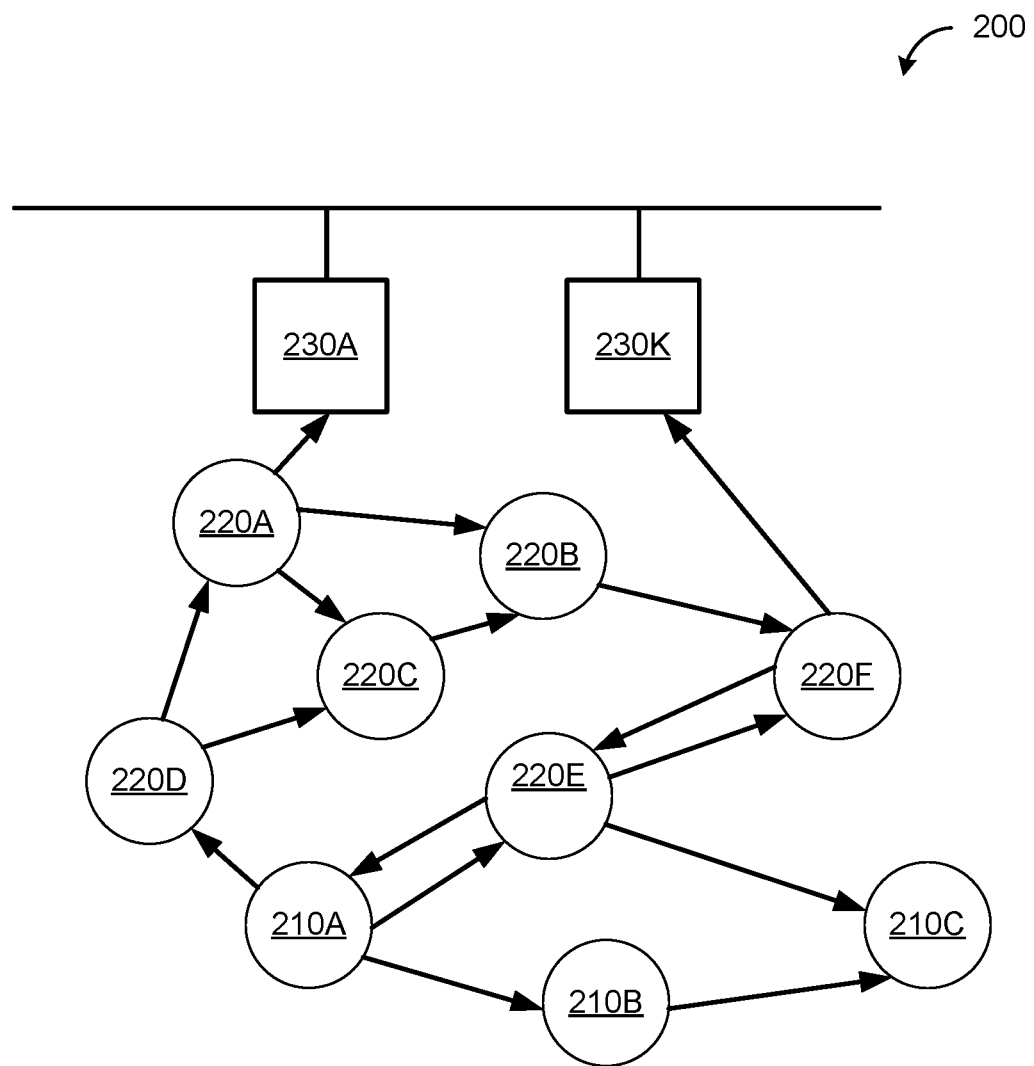
FIG. 2 is a functional network diagram of an illustrative example of a mesh network operating in accordance with embodiments of the present disclosure.

FIG. 2 is a functional network diagram of an illustrative example of a mesh network operating in accordance with embodiments of the present disclosure. In one embodiment, each of the network devices of mesh network 100 of FIG. 1 may implement functions of one or more functional components of FIG. 2. In other embodiments, various other mesh networks may include hardware and/or software components which may implement functions of one or more functional components of FIG. 2.

As schematically illustrated by FIG. 2, an example mesh network 200 may include a set of mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a mesh network operating in accordance the embodiments of the present disclosure (e.g., mesh network 100 of FIG. 1). Discovering available mesh networks may be performed by passive or active scanning. In the passive scanning mode, the network device records the information from any beacon frames that have been received on one or more radio channels. Beacon frames are periodically transmitted by wireless access points in order to allow network devices to detect and identify the mesh network, as well as match communication parameters for determining whether to join the mesh network. In the active scanning mode, the network device may transmit, on each of one or more radio channels supported by the network device, probe request frames in order to solicit responses from available networks. An access point receiving a probe request may generate a probe response advertising the network parameters.

Figure 3A:
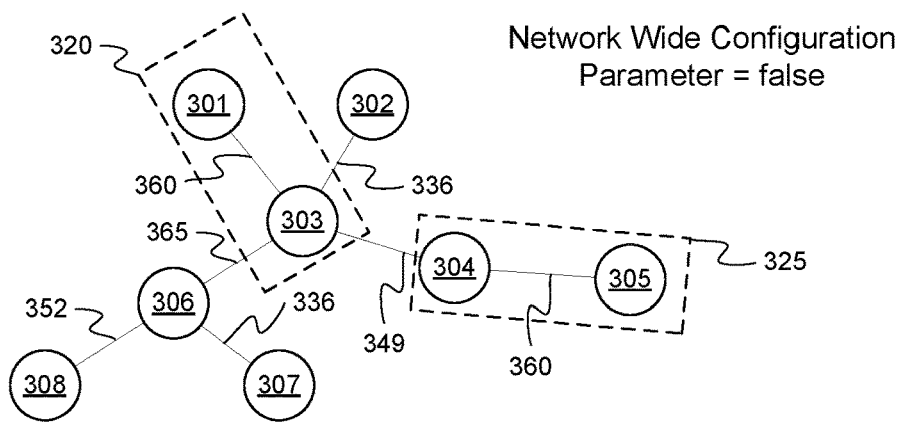
FIGS. 3A-3C illustrate example mesh node configurations in a mesh network, according to embodiments of the present disclosure.
Figure 3B:
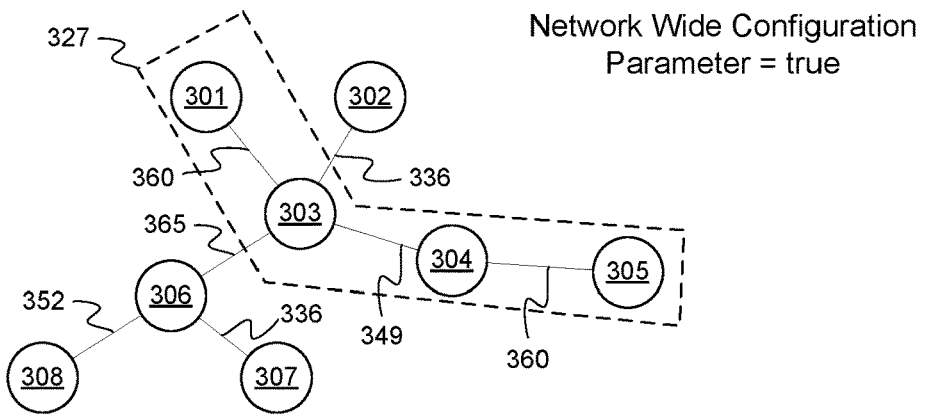
Figure 3C:
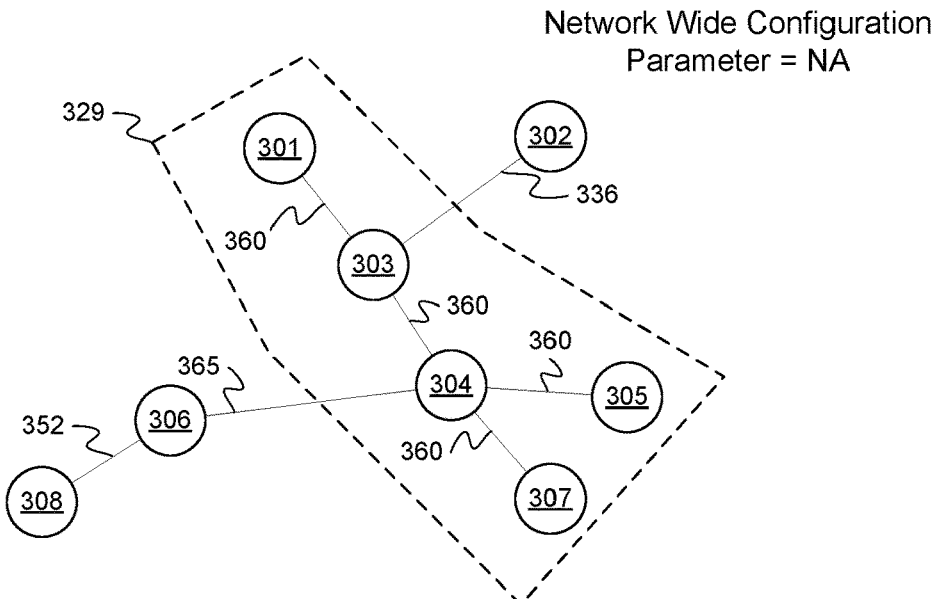

FIGS. 3A-3C illustrate example mesh node configurations in a mesh network, according to embodiments of the present disclosure. As described above, the mesh network may include a number of mesh nodes which communicate with each other over a communication link (e.g., a Wi-Fi link) using predefined communication channels. For example, each communication channel may include a specific frequency or a range of frequencies defined by a certain bandwidth. A single mesh network may include multiple groups of mesh nodes, each using a different communication channel. Since each mesh node may have multiple radios, a single mesh node may also communicate with separate groups of mesh nodes using different communication channels simultaneously. For a given communication channel (e.g., a DFS channel) used by multiple mesh nodes, the protocol and synchronization operations described herein allow the instances of the event and action manager 140 running on each mesh node to ensure that the mesh nodes converge on a common channel in response to the occurrence of an event (e.g., a radar detection event). One goal is to simplify the operation while also minimizing the service disruption for customers of the mesh network. Accordingly, the event and action manager 140 select a master mesh node (also referred to as a "DFS owner" node or "DO" node) for each communication channel being used within the mesh network. Once the master mesh node is elected, that master mesh node can coordinate all channel change operations (or other actions) for the corresponding communication channel. This centralized event coordination simplifies channel change operations among the mesh nodes in the mesh network. In other embodiments, the master/dependent mesh node relationship may not be based on shared radio frequency (RF) communication channels, as described above, but may instead be related to some other shared attribute. For example, one shared attribute may be a common interest in certain types of media. One mesh node may be designated as the master mesh node for a group of mesh nodes who share this attribute and that master mesh node may be responsible for coordinating actions among the group of mesh nodes in response to an event pertaining to the relevant type of media. For example, if one dependent mesh node obtains a media title, that mesh node may send an event message to the designated master mesh node, which may in turn broadcast an event message including a notification for the other dependent mesh nodes that the media title is available.

Multi-radio mesh nodes may use different communication channels to connect to neighboring (or other) mesh nodes in the mesh network. Therefore, the mesh network may be conceptualized as a collection of multiple connected graphs, each using a different communication channel, as illustrated in FIGS. 3A-3C. Depending on the network topology, one mesh node detecting the presence of radar does not necessarily mean that another mesh node in mesh network would also detect the presence of the radar. For example, if the mesh nodes are located some distance apart there may be propagation loss in the radar signal, or if buildings are located between the mesh nodes there may be path loss in the radar signal. As such, the centralized event coordination by the master mesh node for the communication channel can control channel change events. In one embodiment, the event and action manager 140 on the master mesh node may maintain a Boolean configuration parameter ("network wide dfs") which controls the ability to react to a radar detection event either locally or across the entire mesh network. When the configuration parameter is set to a first value (e.g., false), there is one master mesh node per communication channel per connected network segment. A connected segment may refer to a set of mesh nodes that are directly connected to some other mesh nodes on the same communication channel. For example, the mesh nodes in a connected segment may be neighboring mesh nodes that are one signal hop apart, without having any intervening intermediate mesh nodes.

FIG. 3A shows an example topology including mesh nodes 301, 302, 303, 304, 305, 306, 307, and 308 connected via various communication channels 336, 349, 352, and 360. In one embodiment, there are three master mesh nodes 301, 304, and 306, each corresponding to a different connected segment of a communication channel. Master mesh node 301 is associated with communication channel 360 between mesh nodes 301 and 303, forming a first connected network segment 320. Master mesh node 304 is associated with communication channel 360 between mesh nodes 304 and 305, forming a second connected network segment 325. Since mesh node 303 (which communicates with mesh node 302 using communication channel 336 and with mesh node 304 using communication channel 349) is between mesh nodes 301 and 304, there are two separate connected segments that use communication channel 360. Since the configuration parameter "network wide dfs" is sent to false, there are two separate master mesh nodes for the same communication channel (i.e., one for each connected segment). As such, each master mesh node 301 and 304 can react locally to initiate a channel change event in response to local detect of radar, while leaving the other network segment using the same communication channel undisturbed. Master node 306 manages communication channel 352 between mesh nodes 306 and 308.

When the configuration parameter is set to a second value (e.g., true), there is one master mesh node per communication channel for the entire mesh network. FIG. 3B illustrates an example when this configuration parameter is set to true. In this case, radar events are propagated to the entire network and all mesh nodes in the network using the same communication channel (i.e., group 327) are affected by the events. In this example, mesh node 301 is the master mesh node for communication channel 360 and there are a number of dependent mesh nodes 303, 304, and 305. Each of the master mesh node 301 and the dependent mesh nodes 303, 304, and 305 utilize communication channel 360 to communicate with at least one other mesh node in the network, even though mesh nodes 303 and 304 communicate with each other using communication channel 349. In this embodiment, when any one of mesh nodes 301, 303, 304, or 305 detecting radar on communication channel 60, master mesh node 301 may cause all of mesh nodes 301, 303, 304, and 305 to change to a different communication channel, regardless of which mesh nodes actually detected the radar event.

FIG. 3C shows an example of a multi-hop network segment 329, where each of mesh nodes 301, 303, 304, 305, and 307 are connected via the same communication channel 360. In this embodiment, mesh node 304 is elected as the master mesh node by virtue of having the highest number of neighboring mesh nodes (three) on the channel 360. Since all of the mesh nodes that utilize communication channel 360 are part of connected segment 329, the setting of the network wide configuration parameter will not affect operation of event propagation and action coordination.

Using the mesh network illustrated in FIG. 3C as an example, master mesh node election is described below. After the mesh network is formed and nodes are added, the mesh nodes start participating in a master mesh node election. Each mesh node first processes a few beacons distributed by the current master mesh node (e.g., a default mesh node, such as the first mesh node added to the mesh network). The beacons may include master mesh node sub-elements indicating the current master mesh node and a number of peer mesh nodes (i.e., direct neighbors) associated with the current master mesh node. If a mesh node finds an existing master mesh node for the same communication channel, it attempts to determine whether it is a better candidate to be the master mesh node or not. In one embodiment, the event and action manager 140 on the node compares the number of peer mesh nodes to those of the current master mesh node. For example, if mesh node 303 is the current master mesh node, node 303 sends beacons with the master mesh node sub-element to mesh node 301 and to mesh node 304, which propagates the beacons to mesh nodes 305 and 307. The master mesh node sub-element may include an identifier of mesh node 303 (e.g., a MAC address) and the number of peer mesh nodes associated with mesh node 303 (i.e., two). Each of mesh nodes 301, 304, 305, and 307 may perform the election operation described above. Mesh nodes 301, 305, and 307 have only one peer mesh node each, so they will not elect themselves as the new master mesh node. Mesh node 304, however, has three peer mesh nodes (i.e., mesh nodes 303, 305, and 307) that share communication channel 360. Since three peer mesh nodes is more than the two peer mesh nodes that the current master mesh node 303 has, mesh node 304 will elect itself as the new master mesh node. Mesh node 304 will assume the duties of the master mesh node and will begin sending out beacons including its own MAC address and number of peer mesh nodes.

In one embodiment, the criteria to compare whether a mesh node is better master mesh node candidate or not is a function of both the number of direct peers a mesh node currently has and the MAC Address. A node having highest number of direct peers using the same communication channel is elected as the master mesh node in order to minimize channel switch time in response to an event. If two mesh nodes end-up having the same number of direct peers, however, the mesh node with the lower MAC address is elected as the master node. In other embodiments, some other criterion may be used to select the master node when the number of direct peers is equal. As described above, in FIG. 3C, among mesh nodes 301, 303, 304, 305, and 307, all using communication channel 360, mesh node 304 has three direct peers, and thus is elected as the master mesh node for communication channel 360. In FIGS. 3A and 3B, all of the mesh nodes using communication channel 360 have one peer mesh node, and therefore, the mesh nodes with the lowest MAC addresses are elected as the master mesh nodes for communication channel 60.

Figure 4A:
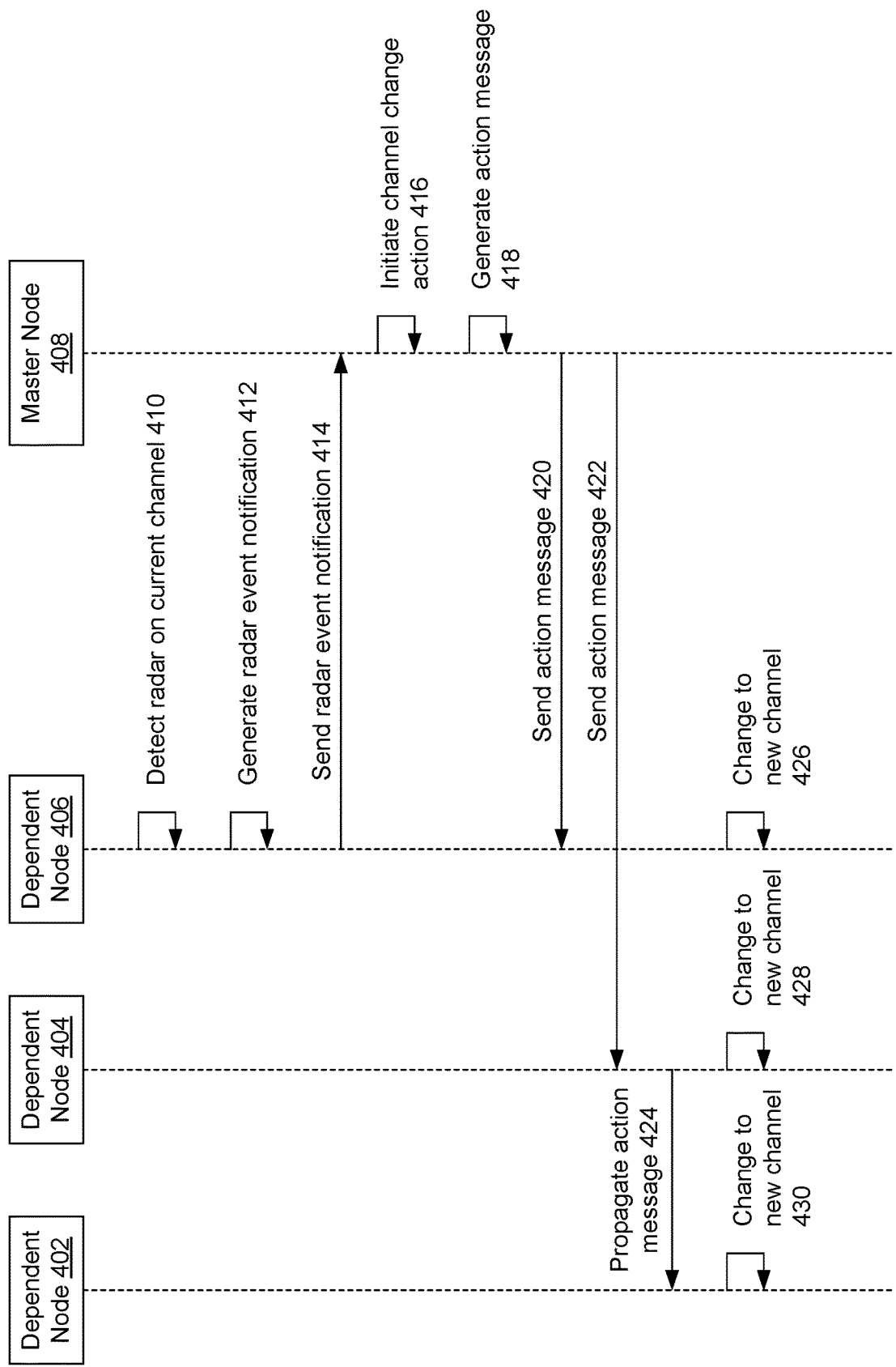
FIG. 4A is a sequence diagram illustrating event propagation and action coordination in a mesh network, according to an embodiment.

FIG. 4A is a sequence diagram illustrating event propagation and action coordination in a mesh network, according to an embodiment. FIG. 4A provides an overview of the event propagation and action coordination procedure, while more details are provided below with respect to FIG. 5. Referring to FIG. 4A, at 410, a dependent mesh node 406 detects radar on a current communication channel. In one embodiment, the mesh node includes a radio system or other component that monitors current communication channels (e.g., frequencies or frequencies or frequency bands used for inter-node communication in the mesh network) for the presence of radar signals or other interference. At 412, dependent mesh node 406 generates a radar event notification signaling the presence of the radar (or other interference), and at 414, sends the radar event notification to master mesh node 408. An example of a radar report sub-element to be sent to the master mesh node is illustrated in FIG. 7A. At 416, master mesh node 408 initiates a channel change action, and at 418, generates an action message. The action message includes instructions to cause dependent mesh nodes that share the current communication channel to take some action as a result of the detected radar event. An example of a master mesh node sub-element containing the action instructions is illustrated in FIG. 7B. At 420, master mesh node 408 sends the action message to dependent mesh node 406, and at 422, sends the action message to dependent mesh node 404. Thus, the action instructions are sent to multiple dependent mesh nodes associated with the same communication channel, including dependent mesh nodes that did not detect the presence of radar themselves. At 424, dependent mesh node 404 propagates the action message to dependent mesh node 402. Certain mesh nodes, such as dependent mesh node 402 may not be a direct peer of the master mesh node 408 and thus may not receive the action message directly from the master mesh node 408. The design of the mesh network allows mesh nodes that are direct peers of the master mesh node to propagate messages from the master mesh node to other dependent mesh nodes, such that all mesh nodes in the mesh network will receive the message eventually. At 426, dependent mesh node 406 changes to a new communication channel. At 428, dependent mesh node 404 changes to the new communication channel. At 430, dependent mesh node 402 changes to the new communication channel. In one embodiment, the new communication channel is identified in the action message and utilizes a different frequency band so as to avoid interference with the detected radar signals. In other embodiments, the action message may include instructions to cause the dependent mesh nodes 402, 404, and 406 to take some other action instead of switching to a new communication channel.

Figure 4B:
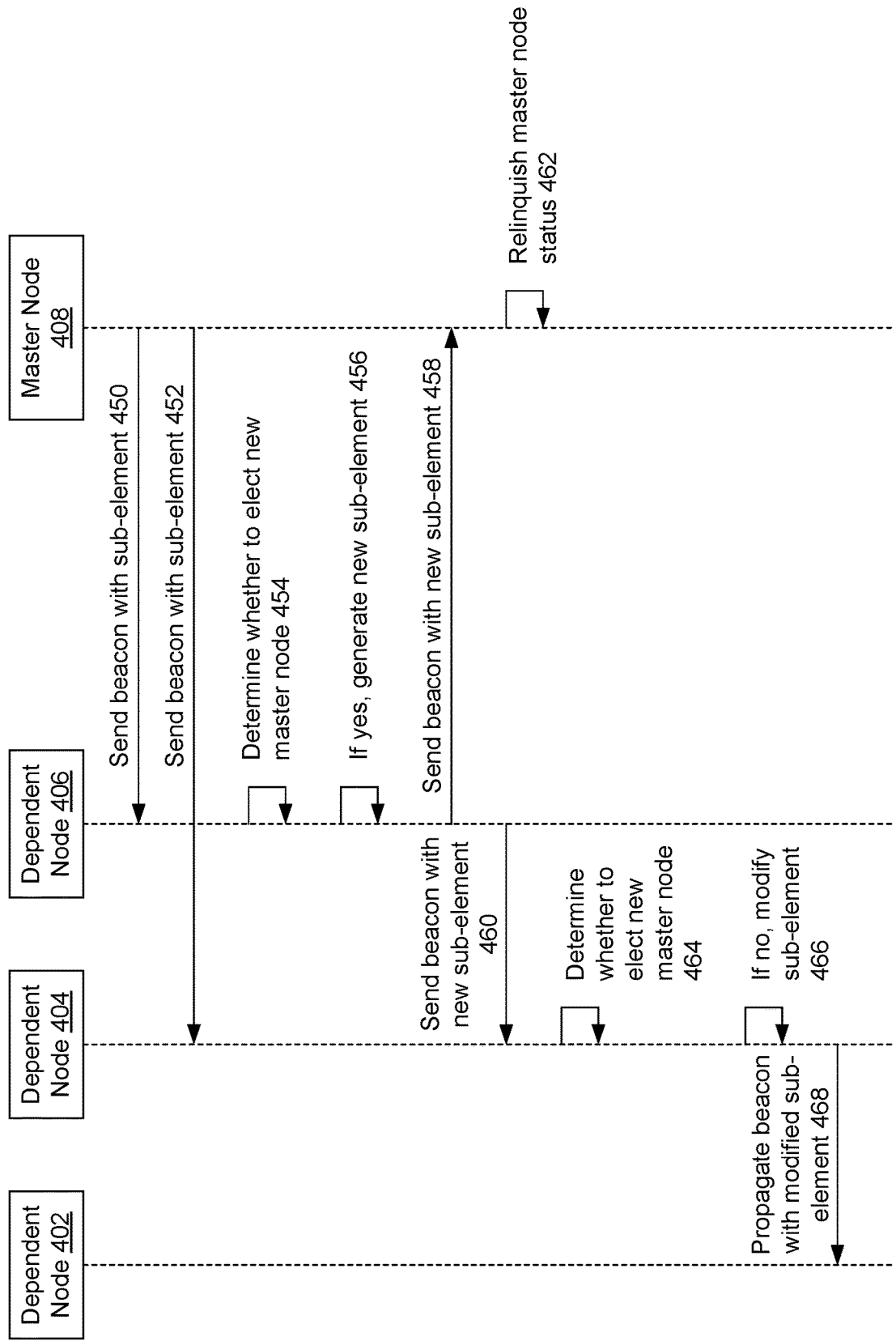
FIG. 4B is a sequence diagram illustrating master mesh node election in a mesh network, according to an embodiment.

FIG. 4B is a sequence diagram illustrating master mesh node election in a mesh network, according to an embodiment. FIG. 4B provides an overview of the master mesh node election procedure, while more details are provided below with respect to FIG. 6. Referring to FIG. 4B, at 450, master mesh node 408 sends a beacon with a master mesh node sub-element to dependent mesh node 406, and at 452, sends the same beacon to dependent mesh node 404. An example of a master mesh node sub-element containing the action instructions is illustrated in FIG. 7B. In one embodiment, the master mesh node sub-element includes an identifier of the master mesh node 408 and an indication of a number of direct peer mesh nodes associated with the master mesh node 408. At 454, dependent mesh node 406 determines whether to elect itself as a new master mesh node. In one embodiment, dependent mesh node 406 determines whether it has a greater number of peer mesh nodes than the master mesh node 408. If so, at 456, dependent mesh node 406 generates a new master mesh node sub-element indicating that mesh node 406 is assuming the role of the master mesh node for the shared communication channel. At 458, mesh node 406 (now the new master mesh node) sends a beacon with the new master mesh node sub-element to mesh node 408 (now a dependent mesh node), and at 460 sends the same beacon to dependent mesh node 404. In one embodiment, the new master mesh node sub-element includes an identifier of the new master mesh node 406 and an indication of a number of direct peer mesh nodes associated with the new master mesh node 406. At 462, mesh node 408 relinquishes its prior status as the master mesh node for the communication channel. At 464, dependent mesh node 404 determines whether to elect itself as a new master mesh node by determining whether it has a greater number of peer mesh nodes than the master mesh node 406. If not, at 466, dependent mesh node 404 modifies the sub-element to increment the hop count, and at 468, propagates the beacon with the modified sub-element to dependent mesh node 402. Certain mesh nodes, such as dependent mesh node 402, may not be a direct peer of the master mesh node 406 and thus may not receive the beacon directly from the master mesh node 406. The design of the mesh network allows mesh nodes that are direct peers of the master mesh node to propagate messages from the master mesh node to other dependent mesh nodes, such that all mesh nodes in the mesh network will receive the message eventually.

Figure 5:
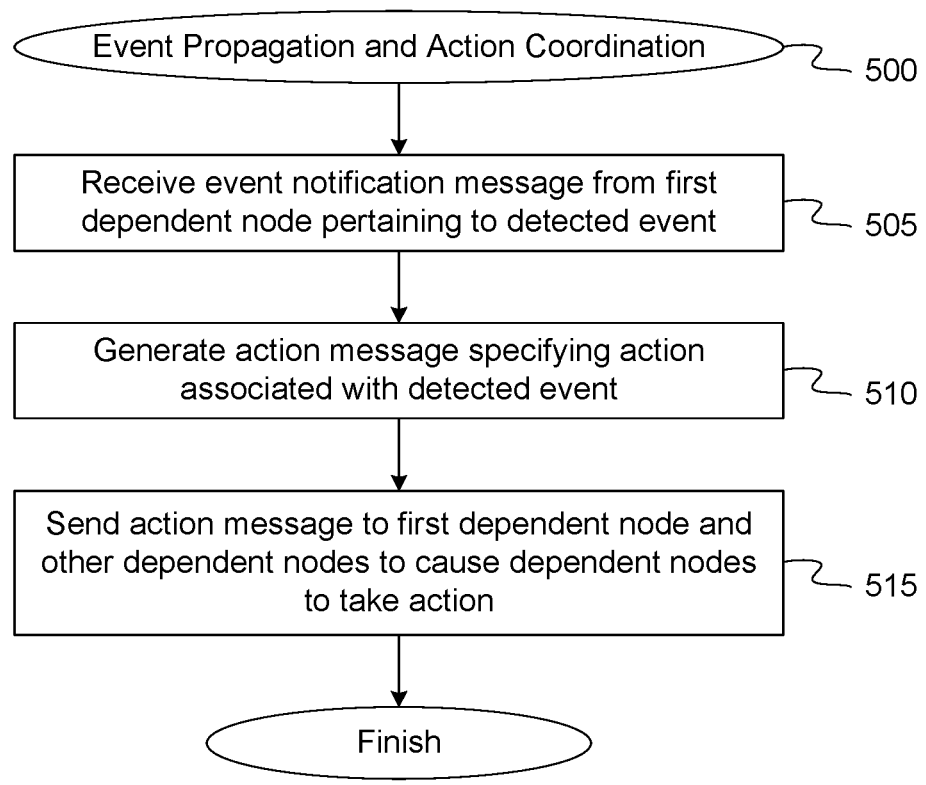
FIG. 5 is a flow diagram illustrating method of event propagation and action coordination in a mesh network, according to an embodiment.

FIG. 5 is a flow diagram illustrating method of event propagation and action coordination in a mesh network, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by event and action manager 140 running on one of mesh nodes 102-110, or in cloud services 120, as shown in FIG. 1. In one embodiment, method 500 is performed is performed by event and action manager 140 running on master mesh node 304, as shown in FIG. 3C.

Referring to FIG. 5, at block 505, method 500 receives a first event notification message from a first dependent mesh node, such as dependent mesh node 305, associated with the master mesh node 304. Master mesh node 304 is configured to coordinate actions for a first set of dependent mesh nodes 301, 303, 305, and 307 in the mesh network that utilize a first communication channel 360 in the mesh network. In one embodiment, the first event notification message pertains to a first event detected by the first dependent mesh node 305. In one embodiment, the first event notification message identifies radar signals or other interference detected by the first dependent mesh node 305 on the first communication channel 360. In another embodiment, the first event notification message identifies a media content item stored on the first dependent mesh node 305 and available for distribution on the first communication channel 360. In other embodiments, the first event notification message identifies any other event detected by the first dependent mesh node 305. An example of a radar report sub-element received by the master mesh node is illustrated in FIG. 7A.

In one embodiment, upon receiving the first event notification message, the event and action manager 140 running on master mesh node 304 may confirm the radar event by looking into a "filtered" subfield of the radar report sub-element. In one embodiment, when filtering is indicated (e.g., by a first value, such as a logic "1"), master mesh node 304 may initiate a channel switch immediately, as this indicates the reporting dependent mesh node has already performed spurious radar event filtering. When filtering is not indicated, however, in one embodiment, master mesh node 304 may wait for some period of time to receive additional messages and may look for received results radar signal strength values and hop counts to make the determination of whether to initiate a channel switch.

At block 510, method 500 generates a first action message specifying a first action associated with the first event. In one embodiment, event and action manager 140 running on master mesh node 304 identifies the first event from the first event notification message and determines a corresponding first action. In one embodiment, the first action comprises instructions to cause the first dependent mesh node 305 that detected the event and the other dependent mesh nodes 301, 303, and 307 to begin exchanging communications with each other and with the master mesh node 304 using a second communication channel in the mesh network. The second communication channel may include a different frequency or different frequency bandwidth than the first communication channel so that the communications on the second communication channel will avoid the radar or other interference detected in the first communication channel. In one embodiment, upon determining a true radar event, the master mesh node schedules the channel switch by inserting IEEE 802.11-2012 Channel Switch Announcement (CSA) elements or Extended Channel Switch Announcement (ESCA) elements into beacons and/or action frames. The new communication channel in the CSA or ECSA element is the channel advertised in the last master mesh node sub-element's next channel field. An example of a master mesh node sub-element containing the action instructions is illustrated in FIG. 7B. In another embodiment, the first action comprises a notification for the other dependent mesh nodes 301, 303, and 307 that the media content item is available from the first dependent mesh node 305.

At block 515, method 500 sends the first action message to the first dependent mesh node 305 and to the other dependent mesh nodes 301, 303, and 307 associated with the master mesh node 304. In response, the dependent mesh nodes 301, 303, 305, and 307 may perform the corresponding action specified in the action message. If a dependent mesh node fails to latch on to the new channel and somehow detects that peer mesh node has left the previous communication channel (e.g., based on inactivity and/or loss of beacons), the dependent mesh node may perform a scan on the channel specified in the last master mesh node sub-element's next channel field. Mesh peering shall not tear down in this case and a mesh communication link shall resume operation upon successful channel change. If for some reason the scan fails, the dependent mesh node may do a full (i.e., all channel) scan to find previously connected neighboring mesh nodes.

Figure 6:
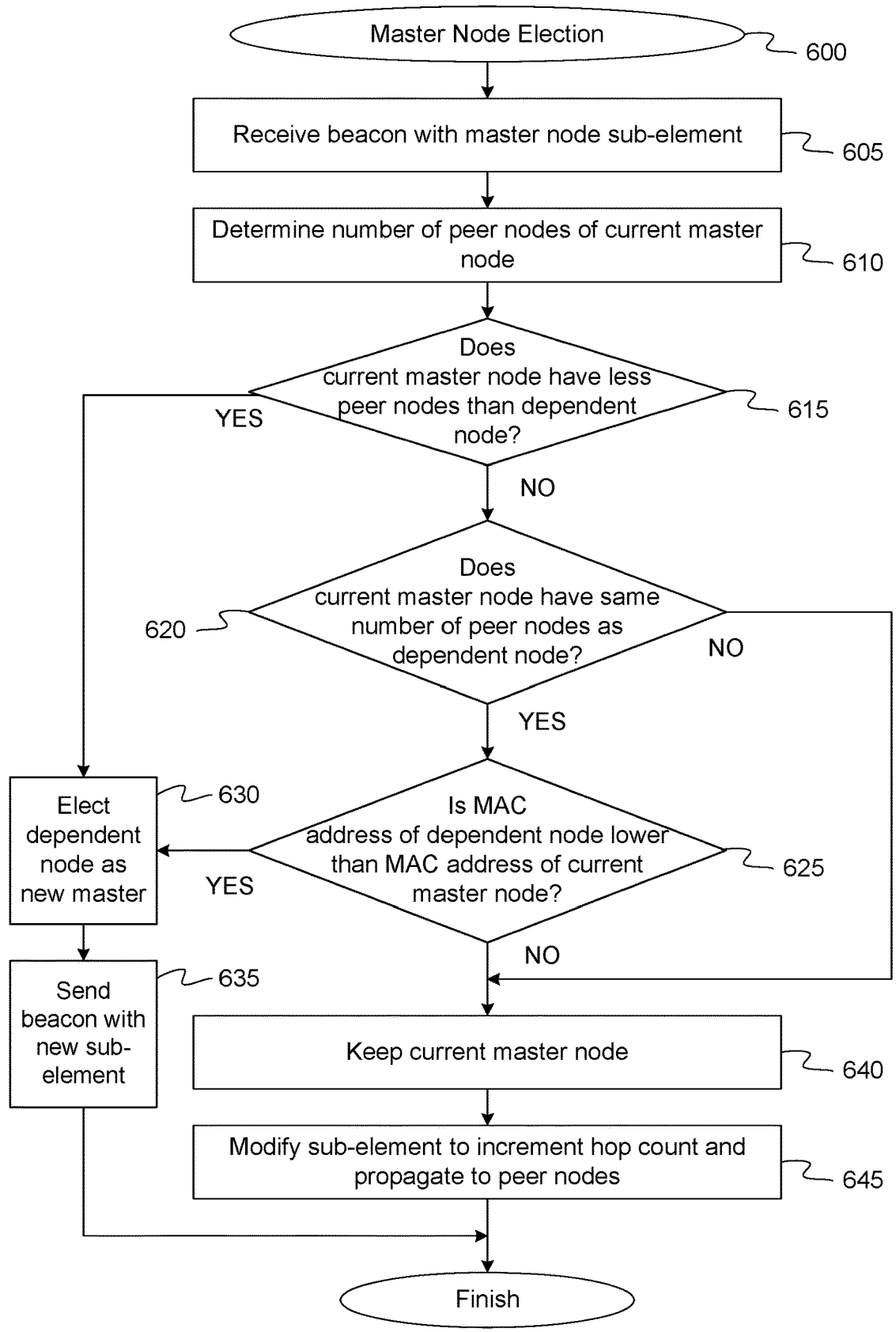
FIG. 6 is a flow diagram illustrating method of master mesh node election in a mesh network, according to an embodiment.

FIG. 6 is a flow diagram illustrating method of gateway selection in a mesh network, according to an embodiment. The method 600 may be performed by processing logic that comprises hardware (e.g., circuitry, dedicated logic, programmable logic, microcode, etc.), software, firmware, or a combination thereof. In one embodiment, method 600 may be performed by event and action manager 140 running on one of mesh nodes 102-110, or in cloud services 120, as shown in FIG. 1. In one embodiment, method 600 is performed is performed by event and action manager 140 running on mesh node 304, as shown in FIG. 3C.

Referring to FIG. 6, at block 605, method 600 receives a first message from a current master mesh node, such as mesh node 303, for a first communication channel 360 in the mesh network, and at block 610, method 600 determines a number of peer mesh nodes associated with the current master mesh node. In one embodiment, the first message comprises a first identifier of the current master mesh node 303 and information about a first number of peer mesh nodes associated with the current master mesh node 303. For example, the first identifier may be a MAC address of mesh node 303 and the information may indicate that mesh node 303 has two directly connected peer mesh nodes that share communication channel 360 (i.e., mesh nodes 301 and 304). Event and action manager 140 running on mesh node 304 may read a corresponding value indicating the number of peer mesh nodes associated with the current master mesh node 303 from a master mesh node sub-element contained within the received message. An example of such a master mesh node sub-element is illustrated in FIG. 7B.

At block 615, method 600 determines whether the first number of peer mesh nodes associated with the current master mesh node is less than a second number of peer mesh nodes associated with the first dependent mesh node. In one embodiment, event and action manager 140 on mesh node 304 compares the numbers of peer mesh nodes to determine whether they are equal or which number is greater. For example, if mesh node 304 has three directly connected peer mesh nodes that share communication channel 360 (i.e., mesh nodes 303, 305, and 307), event and action manager 140 may determine that the first number of peer mesh nodes (i.e., two) associated with the current master mesh node 303 is less than the second number of peer mesh nodes (i.e., three) associated with mesh node 304.

In an embodiment, where the first number of peer mesh nodes associated with the current master mesh node is not less than the second number of peer mesh nodes associated with the dependent mesh node (such as if mesh node 305 having one peer mesh node was the master mesh node and mesh node 307 having one peer mesh node was the dependent mesh node), at block 620, method 600 determines whether the first number of peer mesh nodes is equal to the second number of peer mesh nodes. If the numbers of peer mesh nodes are equal, at block 625, method 600 determines whether a first criterion pertaining to the current master mesh node and the first dependent mesh node is satisfied. In one embodiment, the first criterion is related to the media access control (MAC) addresses of the mesh nodes. For example, event and action manager 140 may determine whether a first MAC address of the first dependent mesh node 307 is lower than a second MAC address of the current master mesh node 305. In one embodiment, event and action manager 140 compares the two MAC addresses value by value from left to right to determine a MAC address with a smaller value at the leftmost position. For example, if the first MAC address is 0010.7bcc.733a and the second MAC address is 0010.7bcc.7347, the first MAC address is lower because the value 3 in the eleventh position from the left in the first MAC address is lower than the value 4 in the eleventh position from the left of the second MAC address. Since MAC addresses generally are expressed in hexadecimal form, the ascending order of values used to determine the size is 0,1,2,3,4,5,6,7,8,9,A,B,C,D,E,F. The MAC addresses are merely one criterion used to select a mesh node to be the master mesh node in the event of the number of peer mesh nodes being equal. In other embodiments, some other criterion may be used to break the tie, such as the current master mesh node may remain the master mesh node when the number of peer mesh nodes is equal.

In response to the first criterion being satisfied at block 625, or in response to the first number of peer mesh nodes being less than the second number of peer mesh nodes at block 615, at block 630, method elects the first dependent mesh node as the new master mesh node for the first communication channel in the mesh network. As a result, the dependent mesh node 304, for example, assumes responsibility for coordinating actions for all dependent mesh nodes that use communication channel 360 from the previous master mesh node 303. At block 635, method 600 sends a second message to the other dependent mesh nodes in the mesh network announcing the status of the new master mesh node. In one embodiment, the second message includes a master mesh node sub-element that has a second identifier of the new master mesh node 304 and information about the second number of peer mesh nodes associated with the new master mesh node 304. An example of such a master mesh node sub-element is illustrated in FIG. 7B.

In response to the first number of peer mesh nodes being greater than the second number of peer mesh nodes at block 620, or in response to the first criterion not being satisfied at block 625, at block 640, method 600 maintains the current master mesh node for the first communication channel in the mesh network. At block 645, method 600 modifies the first message to increment a hop count indicating a number of intermediate mesh nodes between the current master mesh node and the first dependent mesh node to form a modified first message, and sends the modified first message to at least one other dependent mesh node in the mesh network.

FIG. 7A is a block diagram illustrating a radar report sub-element 700, according to an embodiment. Radar report sub-element 700 may be representative of a data element included in an event notification message sent by a dependent mesh node in the mesh network to the master mesh node for the current communication channel. In one embodiment, radar report sub-element 700 includes a number of fields such as timestamp field 701 (8 octets), DFS channel field 702 (1 octet), radar results field 703 (1 octet), and signal strength field 704 (1 octet). In one embodiment, the timestamp field 701 includes a 64-bit value that represents the time in seconds in UNIX Epoch time (i.e., since Jan. 1, 1970 (midnight UTC/GMT)). In other embodiments, the timestamp may have some other format or be expressed in some other system of time. DFS channel field 702 includes an indication of the current communication channel being used in the mesh network (i.e., the communication channel on which the radar event was detected). Radar results field 703 includes a number of sub-fields specified by certain bits. In one embodiment, bit 0 indicates the presence of radar on the communication channel identified in field 702 when set to a certain value (e.g., a logical "1"), and bit 1 indicates whether the radar signal has been filtered (e.g., whether some processing has already been performed to test for false positives, such as by a radar detection module on the dependent mesh node) before being reported. In one embodiment, the remaining bits 2-7 in the radar results field 703 are reserved. Signal strength field 704 includes an indication of the strength of the detected radar signal. In other embodiments, the sub-element 700 may be modified appropriately to convey information pertaining to other types of events besides radar detection events.

A dependent mesh node may send a message including the radar report sub-element 700 to the master mesh node for the current communication channel in response to detecting a radar event. In another embodiment, dependent mesh nodes may send sub-element 700 periodically or in response to some other trigger. In one embodiment, the dependent mesh nodes send sub-element 700 to the master mesh node using the multi-hop action frames. The multi-hop action frames may include a vendor element carrying the radar report sub-element 700. In other embodiments, the dependent mesh nodes may also include sub-element 700 into beacon frames, which helps neighboring peer mesh nodes react quickly to the occurrence of an event. When the master mesh node is located only one-hop away in the mesh network, the dependent mesh node may use a regular action frame or beacon to send the radar report sub-element 700.

FIG. 7B is a block diagram illustrating a master mesh node sub-element 750, according to an embodiment. Master mesh node sub-element 750 may be representative of a data element included in a beacon sent by a master mesh node in the mesh network to all of the dependent mesh nodes for the current communication channel. In one embodiment, master mesh node sub-element 750 includes a number of fields such as master MAC address field 751 (6 octets), current channel field 752 (1 octet), next channel field 753 (1 octet), hop count field 754 (1 octet), and number of peers field 755. In one embodiment, master MAC address field 751 include the MAC address, or some other identifier, of the master mesh node that sent master mesh node sub-element 750. Current channel field 752 includes an indication of the current communication channel being used in the mesh network (i.e., the communication channel on which an event was detected and on which the master mesh node sub-element 750 was sent). Next channel field 753 includes an indication of new communication channel to which the dependent mesh nodes should switch for future communications. In one embodiment, if the dependent mesh node receives a command indicating that it should switch channels, the dependent mesh node can switch to the indicated new communication channel. If such a command has not been received, the dependent mesh node may save an indication of the new communication channel for future use (e.g., if no new beacons have been received for a certain amount of time). Hop count field 754 includes a value representing a number of hops between the sending master mesh node and the receiving dependent mesh node. In one embodiment, a dependent mesh node may increment the value in hop count field 754 prior to forwarding on the master mesh node sub-element to another dependent mesh node in the mesh network. The hop count can be used to limit the propagation of radar events in the mesh network. For example, the beacon including master mesh node sub-element 750 may only be propagated a certain number of hops (e.g., three hops) to ensure that only mesh nodes near where the radar event was detected need to change communication channels. Number of peers field 755 may include an indication of a number of direct peer mesh nodes associated with the current master mesh node (i.e., the number of mesh nodes that are only one hop away from the master mesh node) that share the same communication channel. As described above, dependent mesh nodes in the mesh network may use the value in number of peers field 755 (together with the value in master MAC address field 751) to determine whether to elect a new master mesh node for the current communication channel.

Figure 8:
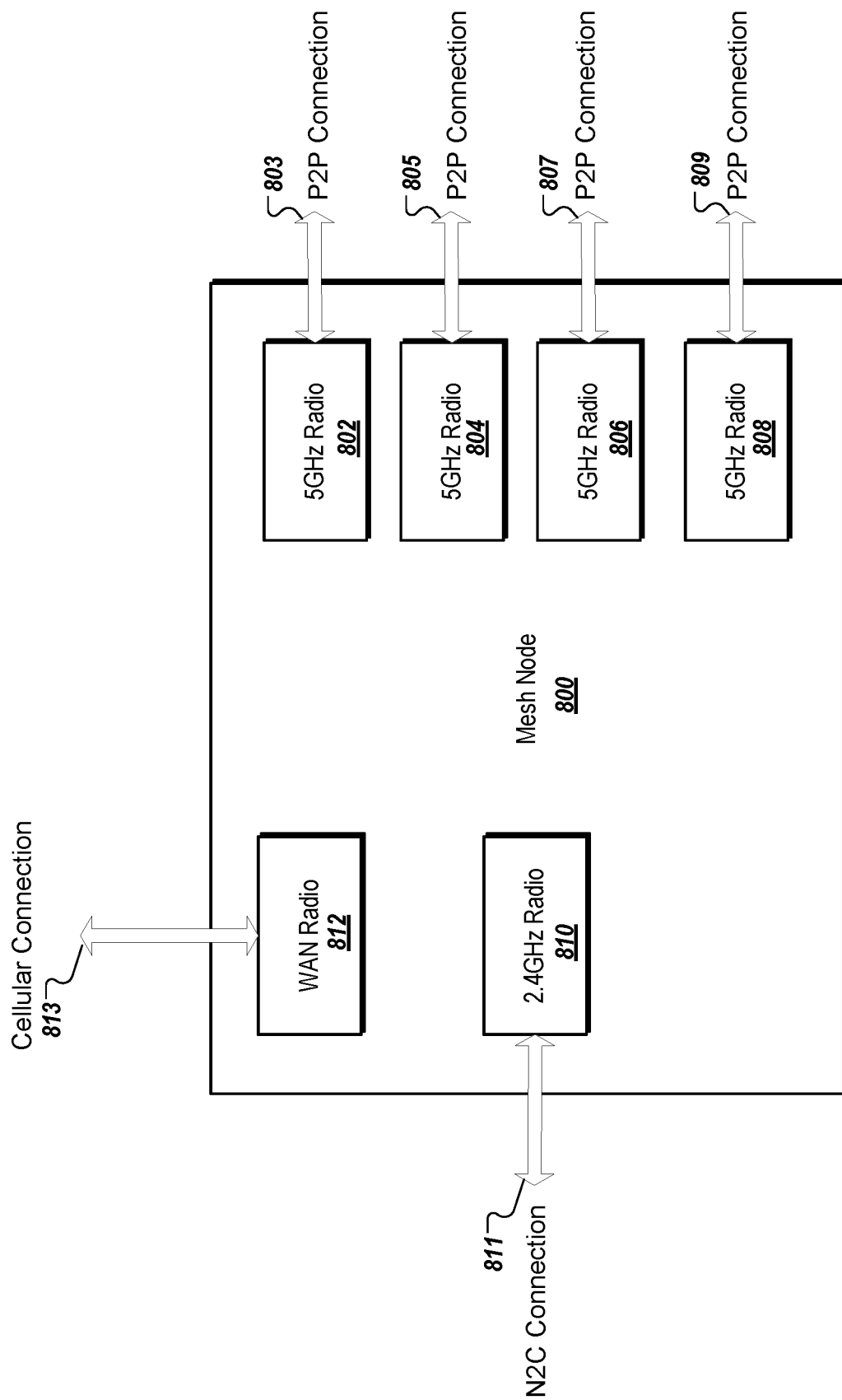
FIG. 8 is a block diagram of a mesh node with multiple radios according to one embodiment.

FIG. 8 is a block diagram of a mesh node 800 with multiple radios according to one embodiment. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a mesh network. The second 5 GHz radio 804 creates a second P2P wireless connection 805 between the mesh node 800 and another mesh node (not illustrated) in the mesh network. The third 5 GHz radio 806 creates a third P2P wireless connection 807 between the mesh node 800 and another mesh node (not illustrated) in the mesh network. The fourth 5 GHz radio 808 creates a fourth P2P wireless connection 809 between the mesh node 800 and another mesh node (not illustrated) in the mesh network. The 2.4 GHz radio 810 creates a N2C wireless connection 811 between the mesh node 800 and a client consumption device (not illustrated) in the mesh network. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh node 800 includes memory to store content files, control and command data, as well as the aggregate data described herein. The memory of the first network hardware device may be volatile memory, non-volatile memory, or a combination of both. When a content file is not stored in the memory or the storage of the mesh node 800, the mesh node 800 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
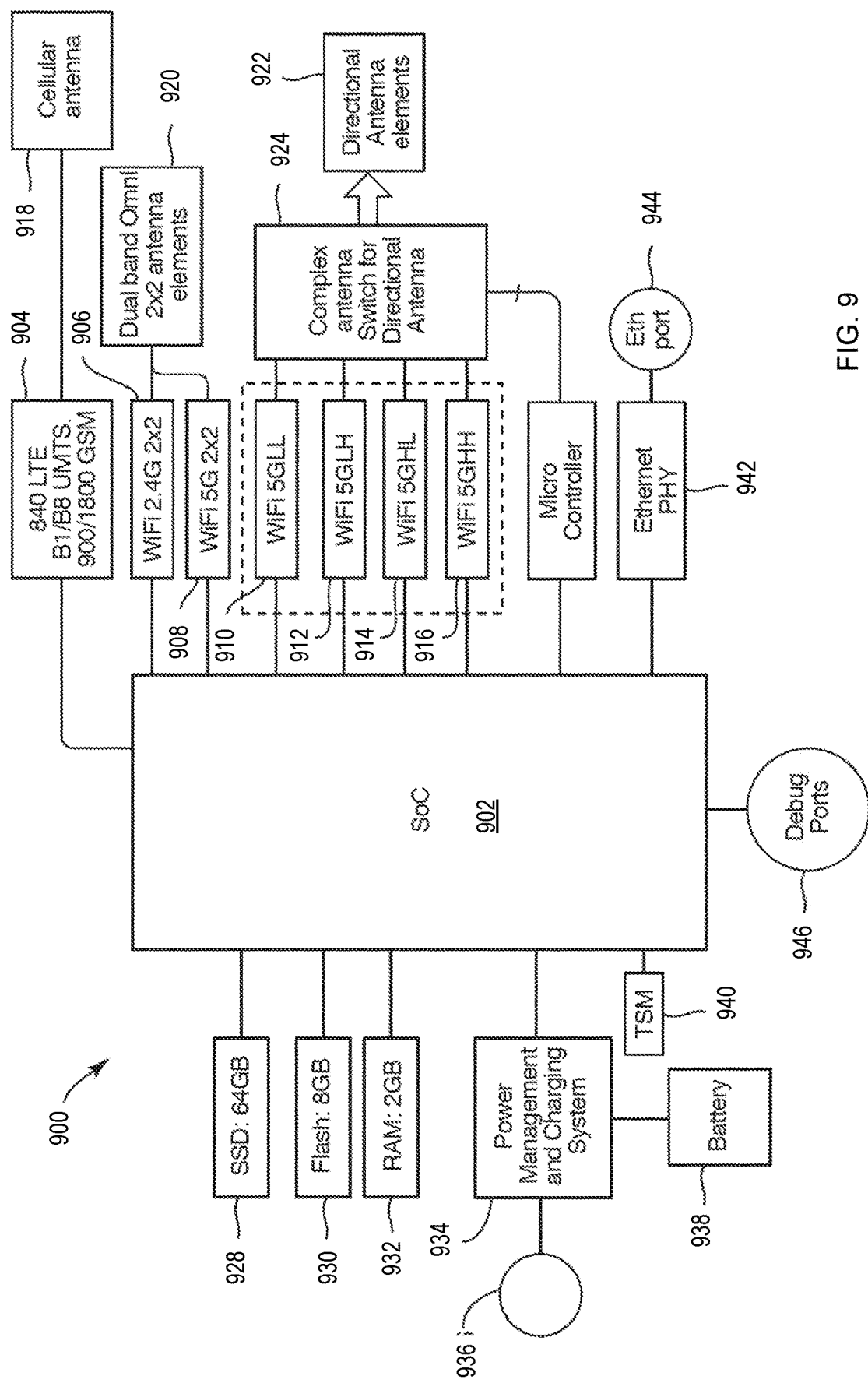
FIG. 9 is a block diagram of a mesh network device according to one embodiment.

FIG. 9 is a block diagram of a mesh network device 900 according to one embodiment. The mesh network device 900 may be one of many mesh network devices organized in a mesh network (e.g., mesh network 100). The mesh network device 900 is one of the nodes in a mesh topology in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 102, 104, 106, 108, and 110 of FIG. 1. In another embodiment, the mesh network device 900 is any one of the network hardware devices 210-230 of FIG. 2.

The mesh network device 900 includes a system on chip (SoC) 902 to process data signals in connection with communicating with other mesh network devices and client consumption devices in the mesh network. The SoC 902 includes a processing element (e.g., a processor core, a central processing unit, or multiple cores) that processes the data signals and controls the radios to communicate with other devices in the mesh network. In one embodiment, the SoC 902 is a dual core SoC, such as the ARM A15 1.5 GHz with hardware network acceleration. The SoC 902 may include memory and storage, such as 2 GB DDR RAM and 64 GB eMMC coupled to the SoC 902 via external HDD interfaces (e.g., SATA, USB3, or the like). The SoC 902 can implement processing logic comprising software, firmware, hardware, or any combination thereof. The SoC 902 may include multiple RF interfaces, such as a first interface to the first RF module 904 (e.g., HSCI interface for cellular module (3G)), a second interface to the WLAN 2.4 GHz radio 906, a third interface to the WLAN 2.4 GHz radio 908, and multiple interfaces to the WLAN 5 GHz radios, such as on a PCIe bus. In one embodiment, the SoC 902 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 928, 8 GB Flash 930, and 2 GB 932. The memory and storage may be coupled to the SoC 902 via one or more interfaces, such as USB 3.0, SATA, or SD interfaces. The mesh network device 900 may also include a single Ethernet port 944 that is an ingress port for Internet Protocol (IP) connection. The Ethernet port 944 is connected to the Ethernet PHY 942, which is connected to the SoC 902. The Ethernet port 944 can be used to service the mesh network device 900. Although the Ethernet port 944 could provide wired connections to client consumption devices, the primary purpose of the Ethernet port 944 is not to connect to client consumption devices, since the 2.4 GHz connections are used to connect to client consumption devices in the mesh network. The mesh network device 900 may also include one or more debug ports 946, which are coupled to the SoC 902. The memory and storage may be used to cache content, as well as store software, firmware or other data for the mesh network device 900.

The mesh network device 900 may also include a power curation and charging system 934. The power management and charging system 934 can be connected to a power supply 936 (e.g., 240V outlet, 120V outlet, or the like). The power management and charging system 934 can also connect to a battery 938. The battery 938 can provide power in the event of power loss. The power management and charging system 934 can be configured to send a SoS message on power outage and backup system state. For example, the WLAN radios can be powered down, but the cellular radio can be powered by the battery 938 to send the SoS message. The battery 938 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the mesh network. The power management and charging system 934 may provide a 15V power supply up to 21 watts to the SoC 902. Alternatively, the mesh network device 900 may include more or less components to operate the multiple antennas as described herein.

The mesh network device 900 includes a first radio frequency (RF) module 904 coupled between the SoC 902 and a cellular antenna 918. The first RF module 904 supports cellular connectivity using the cellular antenna 918. In one embodiment, the cellular antenna 918 includes a primary wide area network (WAN) antenna element and a secondary WAN antenna element. The first RF module 904 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, metadata download, or the like. Alternatively, the first RF module 904 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 906, 908 coupled between the SoC 902 and dual-band omnidirectional antennas 920. A first WLAN module 906 may support WLAN connectivity in a first frequency range using one of the dual-band omnidirectional antennas 920. A second WLAN module 908 may support WLAN connectivity in a second frequency range using one of the dual-band omnidirectional antennas 920. The dual-band omnidirectional antennas 920 may be two omnidirectional antennas for 2.4 GHz. The directional antennas 922 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 920 and the directional antennas 922 can be implemented within a fully switchable antenna architecture controlled by micro controller 926. For example, each 5 GHz radio can choose any 2 sectors (for 2 2×2 MU-MIMO streams).

The mesh network device 900 includes a second set of WLAN modules 910-916 coupled between the SoC 902 and antenna switching circuitry 924. The second set of WLAN modules 910-916 support WLAN connectivity in the second frequency range using a set of directional antennas 922. The second set of WLAN modules 910-916 is operable to communicate with the other mesh network devices of the mesh network. The antenna switching circuitry 924 is coupled to a micro controller 926. The micro controller 926 controls the antenna switching circuitry 924 to select different combinations of antennas for wireless communications between the mesh network device 900 and the other mesh network devices, the client consumption devices, or both. For example, the micro controller 926 can select different combinations of the set of directional antennas 922.

In another embodiment, a filter switch bank is coupled between the antenna switching circuitry 924 and the second set of WLAN modules 910-916. In another embodiment, the filter switch bank can be implemented within the antenna switching circuitry 924.

In the depicted embodiment, the first set of WLAN modules include a first a first 2×2 2.4 GHz MIMO radio 906 and a 2×2 5 GHz MIMO radio 908. The second set of WLAN modules includes a first 2×2 5 GHz MIMO radio 910 ("5GLL"), a second 2×2 5 GHz MIMO radio 912 ("5GLH"), a third 2×2 5 GHz MIMO radio 914 ("5GHL"), and a fourth 2×2 5 GHz MIMO radio 916 ("5GHH"). The dual-band omnidirectional antennas 920 may include a first omnidirectional antenna and a second omnidirectional antenna (not individually illustrated in FIG. 9). The set of directional antennas 922 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 902 can perform sounding operations with the WLAN radios to determine a switch configuration. Switching is not done on a per packet basis or at a packet level. The static switch configuration can be evaluated a few times a day by the SoC 902. The SoC 902 can include the intelligence for switching decision based on neighbor sounding operations done by the SoC 902. The micro controller 926 can be used to program the antenna switching circuitry 924 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 924 includes multiple diplexers and switches to connect different combinations of antennas to the multiple radios. One configuration for the antenna switching circuitry 924 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (AntO and Ant1). These two radios may also have access to all the WLAN 2.4 GHz and 5 GHz band channels. In another embodiment, this architecture also may also have 4G/3G and 2G WAN radio to provide cellular connectivity to the network device 900.

Figure 10:
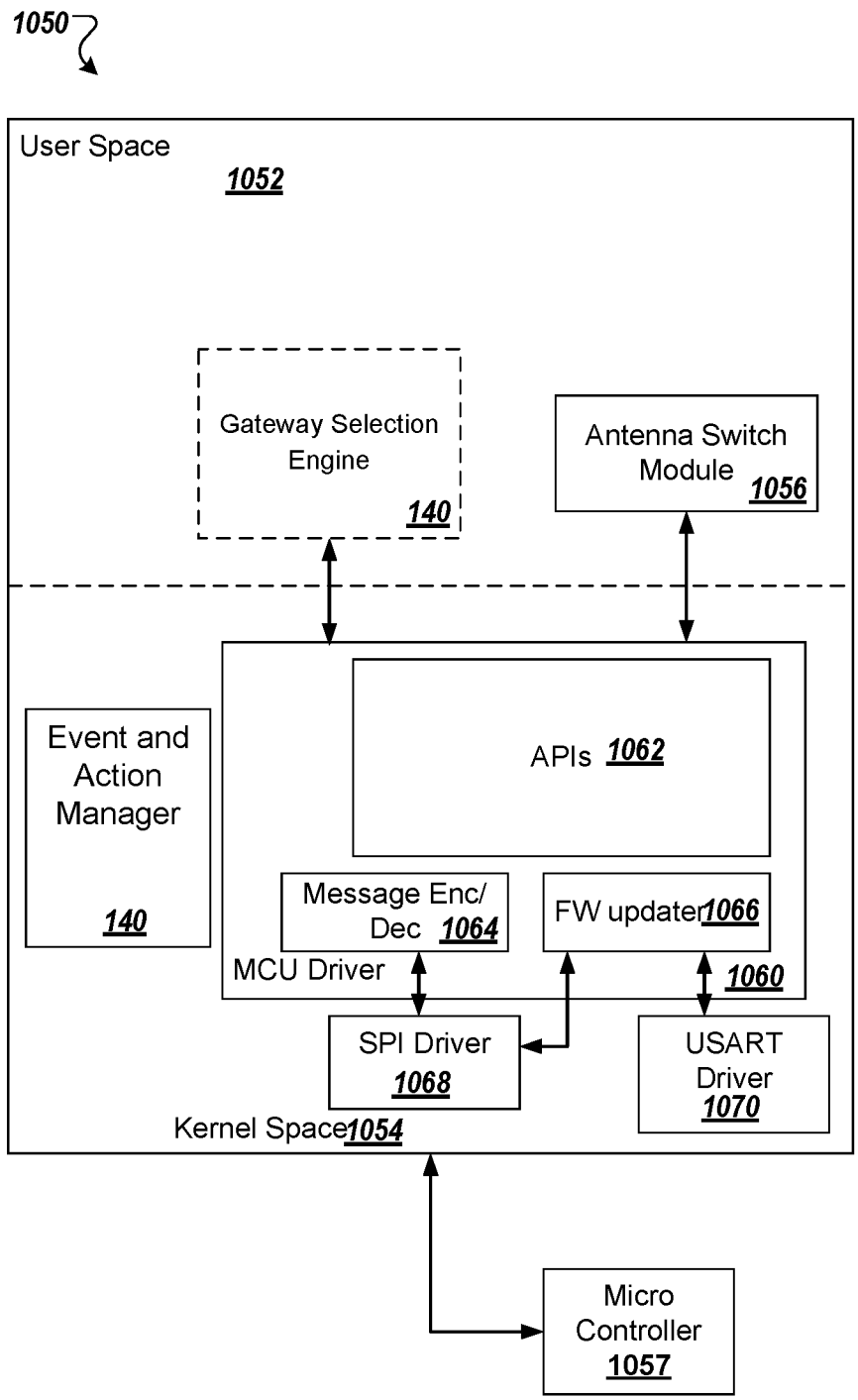
FIG. 10 is a block diagram of an application processor in which the embodiments of the present disclosure may be implemented.

FIG. 10 is a block diagram of an application processor in which the event and action manager 140 operates in accordance with embodiments of the present disclosure may be implemented. The application processor 1050 executes an operating system that segregates memory (virtual memory) into user space 1052 and kernel space 1054. In this embodiment, the event and action manager 140 runs in the user space 1052. In other embodiments, some or the entire event and action manager 140 can be implemented in the kernel space 1054. The event and action manager 140 may be instructions that when executed by the application processor 1050 perform event propagation and action coordination as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the event and action manager 140, the error should be reported as quickly as possible to the application. The application processor 1150 may also include modules in the user space 1152 or in the kernel space 1154 since the application processor 1150 could be operating in a battery-backed operating state during power outages.

Figure 11:
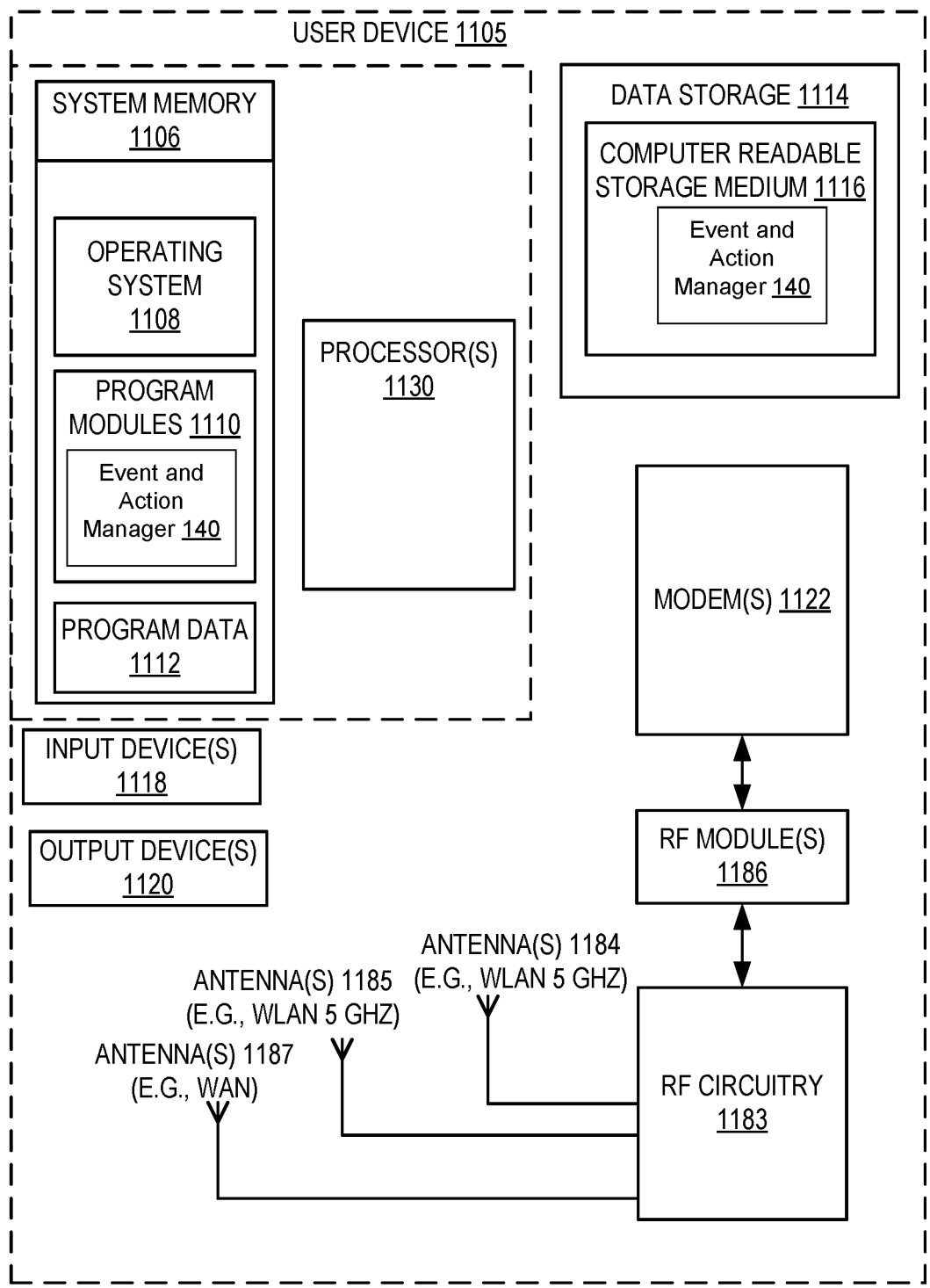
FIG. 11 is a block diagram of a network hardware device according to one embodiment.

FIG. 11 is a block diagram of a network hardware device 1100 with an event and action manager 140 according to one embodiment. The network hardware device 1100 may correspond to the network hardware device 102-110 of FIG. 1. In another embodiment, the network hardware device 1100 may correspond to any of the wireless mesh point stations (MP STA) 210A-210Z, mesh access points (MAP) 220A-220K, and mesh portals (MPP) 230A-220M of FIG. 2. In another embodiment, the network hardware device 1100 may correspond to the mesh node 800 of FIG. 8. In another embodiment, the network hardware device 1100 may correspond to the mesh network device 900 of FIG. 9. In another embodiment, the network hardware device 1100 may correspond to the application processor 1050 of FIG. 10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. The program modules 1110 may include instructions of the event and action manager 140. In one embodiment, the system memory 1106 stores instructions of methods to control operation of the network hardware device 1100. The network hardware device 1100 performs functions by using the processor(s) 1130 to execute instructions provided by the system memory 1106.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, and 1187) are coupled to the RF circuitry 1183, which is coupled to the modem 1122. The RF circuitry 1183 may include radio front-end circuitry, antenna switching circuitry, impedance matching circuitry, or the like. In one embodiment, the RF circuitry 1183 includes the RFFE circuitry with high selectivity performance as described in the various embodiments of FIGS. 5-12. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, and 1187 may be configured to transmit in different frequency bands and/or using different wireless communication protocols. The antennas 1184, 1185, and 1187 may be directional, omnidirectional, or non-directional antennas. In addition to sending data, antennas 1184, 1185, and 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the mesh network and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

Figure 12:
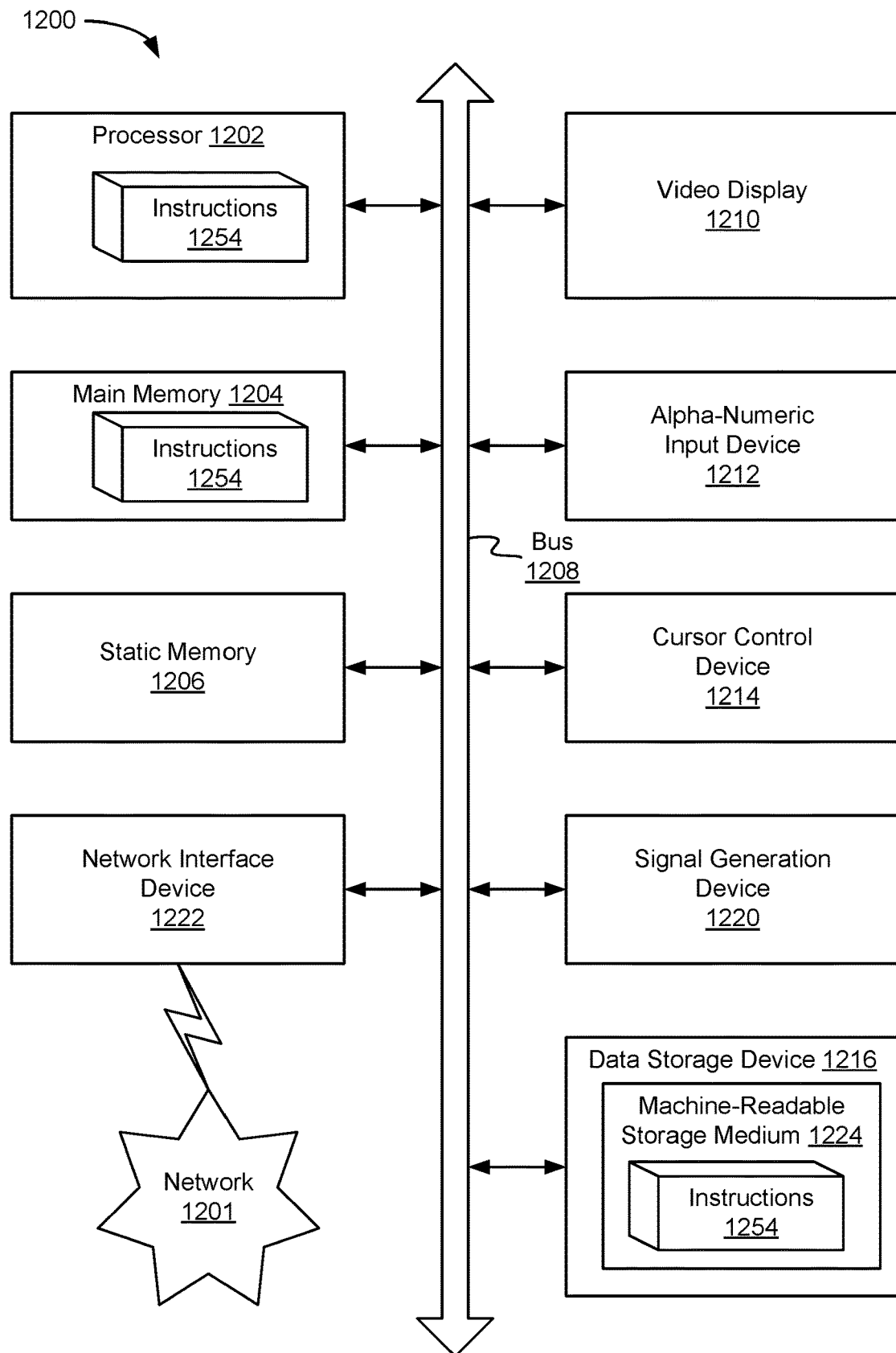
FIG. 12 illustrates a component diagram of a computer system which may implement one or more methods described herein.

FIG. 12 illustrates a component diagram of a computer system which may implement one or more methods of event propagation and action coordination as described herein. A set of instructions for causing the computer system 1200 to perform any one or more of the methods discussed herein may be executed by the computer system 1200. In one embodiment, the computer system 1200 may implement the functions of the event and action manager 140 of FIG. 1. Alternatively, the computer system 1200 may implement functions of the event and action manager 140 in a central entity.

In one embodiment, the computer system 1200 may be connected to other computer systems by a network 1201 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.) and a data storage device 1216, which communicate with each other via a bus 1208.

In one embodiment, the processing device 1202 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1202 may therefore include multiple processors. The processing device 1202 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor or the like.

In one embodiment, the computer system 1200 may further include one or more network interface devices 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker).

In one embodiment, the data storage device 1218 may include a computer-readable storage medium 1224 on which is stored one or more sets of instructions 1254 embodying any one or more of the methods or functions described herein. The instructions 1254 may also reside, completely or at least partially, within the main memory 1204 and/or within the processing device 1202 during execution thereof by the computer system 1200; the main memory 1204 and the processing device 1202 also constituting machine-readable storage media.

While the computer-readable storage medium 1224 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of event propagation and action coordination in a mesh network, the method comprising:
    receiving, by a first mesh node in a mesh network configured as a dependent node in a first set of dependent mesh nodes, the first mesh node having a first number of peer mesh nodes, a first beacon comprising a first identifier of a second mesh node configured as a master mesh node for a first communication channel and information about a second number of peer mesh nodes associated with the second mesh node, wherein as the master mesh node, the second mesh node is configured to coordinate dynamic frequency selection (DFS) actions for the first set of dependent mesh nodes in the mesh network that communicate over the first communication channel;
    determining that the second number of peer mesh nodes is less than the first number of peer mesh nodes;
    sending, by the first mesh node, a second beacon comprising a second identifier of the first mesh node and information about the first number of peer mesh nodes, wherein the second beacon indicates to the first set of dependent mesh nodes that the first mesh node is now configured as the master mesh node;
    receiving, by the first mesh node, a first message from a dependent mesh node in the first set of dependent mesh nodes, the first message comprising an indication of one or more radar signals detected by the dependent mesh node on the first communication channel; and
    sending a second message to the first set of dependent mesh nodes, the second message comprising an instruction that causes the first set of dependent mesh nodes to cease communication using the first communication channel and to utilize a second communication channel.

2. The method of claim 1, further comprising:
    determining that a network wide configuration parameter for the mesh network is set to true, wherein the network wide configuration parameter indicates whether to make a global or a local change in the mesh network; and
    sending the first action message to a second set of dependent mesh nodes in the mesh network that also utilize the first communication channel, wherein the second set of dependent mesh nodes are not directly coupled to the first set of dependent mesh nodes.

3. A mesh node comprising:
    one or more processors; and
    memory to store computer-executable instructions that, if executed, cause the one or more processors to:
        send a first message to a set of dependent mesh nodes in a mesh network, the first message comprising a first identifier of the mesh node and information about a first number of peer mesh nodes associated with the mesh node, the first message indicating to the first set of dependent mesh nodes that the first mesh node is configured as a master mesh node for a first communication channel in the mesh network;
        receive a second message from a first dependent mesh node in the set of dependent mesh nodes, the second message indicating a first event detected by the first dependent mesh node;
        generate a third message specifying a first action associated with the first event; and send the third message to the set of dependent mesh nodes to cause the set of dependent mesh nodes to execute the first action, wherein the master mesh node and the set of dependent mesh nodes communicate with each other using the first communication channel in the mesh network.

4. The mesh node of claim 3, wherein the second message identifies at least one of a radar signal or other interference detected by the first dependent mesh node on the first communication channel.

5. The mesh node of claim 4, wherein the first action associated with the first event comprises directions to cause the set of dependent mesh nodes to utilize a second communication channel in the mesh network to communicate with each other and with the master mesh node.

6. The mesh node of claim 3, wherein the instructions further cause the one or more processors to:
receive a fourth message from a second dependent mesh node of the set of dependent mesh nodes, the fourth message comprising a second identifier of the second dependent mesh node and information about a second number of peer mesh nodes associated with the second dependent mesh node, wherein the second number of peer mesh nodes is greater than the first number of peer mesh nodes, the fourth message comprising a hop count indicating a number of intermediate mesh nodes between the second dependent mesh node and the mesh node and indicating that the second dependent mesh node is now configured as the master mesh node for the first communication channel.

7. The mesh node of claim 6, wherein the instructions further cause the one or more processors to:
generate a modified fourth message by incrementing the hop count by one; and
send the modified fourth message to a third dependent mesh node in the mesh network, wherein the third dependent mesh node does not receive the fourth message directly from the second dependent mesh node.

8. The mesh node of claim 6, wherein the instructions further cause the one or more processors to:
detect a second event;
send a fifth message to the master mesh node, the fifth message indicating the second event;
receive a sixth message specifying a second action associated with the second event; and
perform the second action.

9. The mesh node of claim 3, wherein the instructions further cause the one or more processors to:
determine that a network wide configuration parameter for the mesh network is set to true, wherein the network wide configuration parameter indicates whether to make a global or a local change in the mesh network; and
send the third message to another set of dependent mesh nodes to cause the other set of dependent mesh nodes to execute the first action, wherein the other set of dependent mesh nodes also utilize the first communication channel and are not directly coupled to the first set of dependent mesh nodes.

10. The mesh node of claim 3, wherein the first number of peer mesh nodes associated with the mesh node comprises a number of mesh nodes that are direct neighbors of the mesh node, with no intervening mesh nodes, and that utilize the first communication channel.

11. The mesh node of claim 3, wherein the first communication channel comprises one of a frequency or a range of frequencies designated for communication by the master mesh node and the set of dependent mesh nodes.

12. A method comprising:
receiving, by a first mesh node configured as a dependent mesh node in a mesh network and having a first number of peer mesh nodes, a first message from a second mesh node configured as a master mesh node for a first communication channel in the mesh network, the first message comprising a first identifier of the second mesh node and information about a second number of peer mesh nodes associated with the second mesh node;
determining that the second number of peer mesh nodes is one of (i) less than or (ii) equal to the first number of peer mesh nodes associated; and
in response to the second number of peer mesh nodes being less than the first number of peer mesh nodes, configuring the first mesh node as the master mesh node for the first communication channel in the mesh network.

13. The method of claim 12, further comprising:
sending, by the first mesh node, a second message to the second mesh node and to a third mesh node configured as a dependent mesh node in the mesh network, the second message comprising a second identifier of the first mesh node and information about the first number of peer mesh nodes associated with the first mesh node, the second message indicating that the first mesh node is now configured as the master mesh node for the first communication channel.

14. The method of claim 12, further comprising:
generating a modified first message by incrementing a hop count in the first message by one, the hop count indicating a number of intermediate mesh nodes between the first mesh node and the second mesh node; and
sending the modified first message to a third mesh node configured as a dependent mesh node in the mesh network.

15. The method of claim 12, further comprising:
in response to the first number of peer mesh nodes being equal to the second number of peer mesh nodes, determining that a first criterion pertaining to the first mesh node and the second mesh node is satisfied; and
in response to the first criterion being satisfied, configuring the first mesh node as the master mesh node for the first communication channel in the mesh network.

16. The method of claim 12, wherein determining whether the first criterion is satisfied comprises determining whether a first media access control (MAC) address of the first mesh node has a lower value than a second MAC address of the second mesh node.

17. The method of claim 12, further comprising:
receiving by the first mesh node, a third message indicating an event detected by one of the peer mesh nodes associated with the first mesh node;
generating an action message specifying an action associated with the event; and
sending the action message to the peer mesh nodes associated with the first mesh node.

18. The method of claim 17, wherein the third message identifies at least one of a radar signal or other interference detected by the one of the peer mesh nodes associated with the first mesh node on the first communication channel, and wherein the action associated with the event comprises directions to cause the peer mesh nodes to associated with the first mesh node utilize a second communication channel in the mesh network.

19. The method of claim 12, wherein the first number of peer mesh nodes associated with the first mesh node comprises a number of mesh nodes that are direct neighbors of the first mesh node, with no intervening mesh nodes, and that utilize the first communication channel.

20. The method of claim 12, wherein the first communication channel comprises one of a frequency or a range of frequencies designated for communication by the master mesh node and the dependent mesh node.

\* \* \* \* \*